US011977551B2

(12) United States Patent
Miseldine et al.

(10) Patent No.: US 11,977,551 B2
(45) Date of Patent: May 7, 2024

(54) DIGITAL PAPER BASED INTERACTION TO SYSTEM DATA

(71) Applicant: SAP SE, Walldorf (DE)

(72) Inventors: Philip Miseldine, Karlsruhe (DE); Judith Schneider, Sulzfeld (DE); Sebastian Werner, Weinheim (DE); Margo Lutes, Walldorf (DE); Gergana Savova, Walldorf (DE); Niels Hebling, Walldorf (DE); Normen Rosch, Heidelberg (DE)

(73) Assignee: SAP SE, Walldorf (DE)

( * ) Notice: Subject to any disclaimer, the term of this patent is extended or adjusted under 35 U.S.C. 154(b) by 935 days.

(21) Appl. No.: 16/134,601

(22) Filed: Sep. 18, 2018

(65) Prior Publication Data
US 2019/0362008 A1    Nov. 28, 2019

Related U.S. Application Data

(60) Provisional application No. 62/675,945, filed on May 24, 2018.

(51) Int. Cl.
*G06F 16/2457*     (2019.01)
*G06F 3/0483*     (2013.01)
(Continued)

(52) U.S. Cl.
CPC ...... *G06F 16/24575* (2019.01); *G06F 3/0483* (2013.01); *G06F 3/04883* (2013.01);
(Continued)

(58) Field of Classification Search
CPC ........... G06F 16/24575; G06F 16/9038; G06F 16/90332; G06F 16/248; G06F 16/9535; G06F 16/245; G06F 16/285; G06F 16/951
See application file for complete search history.

(56) References Cited

U.S. PATENT DOCUMENTS

| | | |
|---|---|---|
| 6,687,876 B1 | 2/2004 | Schilit et al. |
| 7,546,525 B2 | 6/2009 | Bargeron |

(Continued)

FOREIGN PATENT DOCUMENTS

WO    WO-2017/106531 A1    6/2017

OTHER PUBLICATIONS

Drecznski.pdf Machine learning techniques for document selection Department of Computer Science, University of Sheffield Module: COM3021 Apr. 25, 2006 (Year: 2006).*

(Continued)

*Primary Examiner* — Vaishali Shah
*Assistant Examiner* — Berhanu Mitiku
(74) *Attorney, Agent, or Firm* — Sterne, Kessler, Goldstein & Fox P.L.L.C.

(57) ABSTRACT

Disclosed herein are system, method, and computer program product embodiments for providing a natural, pen-and-paper user experience that harnesses cutting edge artificial intelligence and machine learning to enhance user interactions with data in a suite of software applications. The pen-and-paper user experience may mimic the time-honored human tradition of writing with pen and paper, allowing users to work in an intuitive, productive, familiar fashion. The user experience may automatically retrieve objects, e.g., data, charts, tables, graphs, etc. from backend systems and display the objects in the user experience. The user experience may allow users to provide additional natural language directly on or around the objects and update the displayed results accordingly.

20 Claims, 20 Drawing Sheets

(51) Int. Cl.
| | |
|---|---|
| G06F 3/04883 | (2022.01) |
| G06F 9/54 | (2006.01) |
| G06F 16/248 | (2019.01) |
| G06F 16/28 | (2019.01) |
| G06F 16/9032 | (2019.01) |
| G06F 16/9038 | (2019.01) |
| G06F 16/951 | (2019.01) |
| G06F 16/9535 | (2019.01) |
| G06F 21/62 | (2013.01) |
| G06N 5/022 | (2023.01) |
| G06N 20/00 | (2019.01) |
| G06V 30/32 | (2022.01) |

(52) U.S. Cl.
CPC .............. *G06F 9/54* (2013.01); *G06F 16/248* (2019.01); *G06F 16/285* (2019.01); *G06F 16/90332* (2019.01); *G06F 16/9038* (2019.01); *G06F 16/951* (2019.01); *G06F 16/9535* (2019.01); *G06F 21/6218* (2013.01); *G06N 5/022* (2013.01); *G06N 20/00* (2019.01); *G06V 30/32* (2022.01)

(56) References Cited

U.S. PATENT DOCUMENTS

| | | | |
|---|---|---|---|
| 7,761,499 | B2 | 7/2010 | Hodjat et al. |
| 8,661,555 | B2 | 2/2014 | Miseldine |
| 9,430,141 | B1 | 8/2016 | Lu et al. |
| 10,446,147 | B1 | 10/2019 | Moniz et al. |
| 10,853,396 | B2 | 12/2020 | Miseldine et al. |
| 10,943,061 | B2 | 3/2021 | Avery et al. |
| 2005/0055628 | A1* | 3/2005 | Chen .................... G06F 40/171 715/232 |
| 2008/0134220 | A1 | 6/2008 | Weiss et al. |
| 2009/0100004 | A1* | 4/2009 | Andrei ................ G06F 16/2453 |
| 2010/0262836 | A1 | 10/2010 | Peukert et al. |
| 2011/0320187 | A1* | 12/2011 | Motik ................ G06F 16/3344 704/9 |
| 2012/0065997 | A1 | 3/2012 | Farooq et al. |
| 2013/0138424 | A1* | 5/2013 | Koenig ................... G10L 21/00 704/9 |
| 2013/0325833 | A1* | 12/2013 | Guan ..................... G09B 19/06 707/706 |
| 2014/0019905 | A1 | 1/2014 | Kim et al. |
| 2014/0168716 | A1* | 6/2014 | King ................... G06F 16/5846 358/473 |
| 2016/0179934 | A1 | 6/2016 | Stubley et al. |
| 2016/0275148 | A1* | 9/2016 | Jiang ............... G06F 16/24522 |
| 2017/0046124 | A1 | 2/2017 | Nostrant |
| 2017/0109029 | A1 | 4/2017 | Lee et al. |
| 2017/0131897 | A1* | 5/2017 | Morita ................ G06F 3/04886 |
| 2017/0140219 | A1* | 5/2017 | King ..................... G06F 40/166 |
| 2017/0177088 | A1 | 6/2017 | Miseldine |
| 2017/0200133 | A1 | 7/2017 | Werner et al. |
| 2017/0242886 | A1* | 8/2017 | Jolley .................. G06F 40/205 |
| 2017/0262530 | A1* | 9/2017 | Okura ................. G06F 16/3344 |
| 2018/0032505 | A1* | 2/2018 | Hoetzer ................. G06Q 40/08 |
| 2018/0096026 | A1* | 4/2018 | Schaefer ............. G06F 16/2452 |
| 2019/0034540 | A1* | 1/2019 | Perkins ............... G06F 16/9535 |
| 2019/0156162 | A1* | 5/2019 | King ..................... G06F 40/00 |
| 2019/0197185 | A1 | 6/2019 | Miseldine et al. |
| 2019/0306107 | A1 | 10/2019 | Galbraith et al. |
| 2019/0361599 | A1 | 11/2019 | Miseldine et al. |
| 2019/0362009 | A1 | 11/2019 | Miseldine et al. |

OTHER PUBLICATIONS

Foley et al. The Human Factors of Computer Graphics Interaction Techniques IEEE CG&A Nov. 1984 (Year: 1984).*

EP Extended European Search Report in Appln. No. 10193366.4, dated Nov. 26, 2018, 7 pages.

* cited by examiner

Lorem Ipsum Title
Lorem Ipsum Subtitle

| Loren ipsum | Lorem ipsum | Value ▼ | Value |
|---|---|---|---|
| Dolor si amet | Dolor si amet | 1 | 12345 |
| Dolor si amet | Dolor si amet | 2 | 12345 |
| Dolor si amet | Dolor si amet | 2 | 12345 |
| Dolor si amet | Dolor si amet | 4 | 12345 |
| Dolor si amet | Dolor si amet | 4 | 12345 |
| Dolor si amet | Dolor si amet | 8 | 12345 |
| Dolor si amet | Dolor si amet | 8 | 12345 |
| Dolor si amet | Dolor si amet | 8 | 12345 |
| Dolor si amet | Dolor si amet | 9 | 12345 |
| Dolor si amet | Dolor si amet | 12 | 12345 |

10 of 96 entries

FIG. 4I

Lorem Ipsum Title
Lorem Ipsum Subtitle

| Loren ipsum | Lorem ipsum | Value ▼ |
|---|---|---|
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |
| Dolor si amet | Dolor si amet | 12345 |

10 of 96 entries

FIG. 4J

DIGITAL PAPER BASED INTERACTION TO SYSTEM DATA

CROSS-REFERENCE TO RELATED APPLICATIONS

This application claims the benefit of U.S. Provisional Patent Application 62/675,945, by Miseldine, et at., "E-Quill Digital Paper Based Interaction to System Data," filed May 24, 2018, which is hereby incorporated by reference in its entirety.

This application is related to U.S. patent application Ser. No. 16/134,616 titled "Inscribe: Machine Learning In Digital Paper Based Interaction," and U.S. patent application Ser. No. 16/134,613 titled "Inscribe Ambiguity Resolution In Digital Paper Based Interaction," both of which are herein incorporated by reference in their entireties.

BACKGROUND

Generally speaking, humans interact with computer systems and forms of artificial intelligence embedded in those systems through means of input. In some cases, the input may be text-based, and a user may question and request information from a computer, digital assistant, interface, IoT (internet of things) device, digital boardroom, key performance indicator tool, etc., using natural language. A uniform user experience may frame and harmonize these interactions. Such natural-language-based user experiences traditionally suffer difficulties in understanding wide varieties of ambiguous input and require users to repeatedly engage with the user experience in redundant and menial fashions.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art(s) to make and use the embodiments.

FIGS. 4A-4L are example screen displays of exemplary user interactions in an exemplary user experience, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method, and/or computer program product embodiments, and/or combinations and sub-combinations thereof, for providing a natural, pen-and-paper user experience that harnesses cutting edge artificial intelligence and machine learning to enhance user interactions with data-driven software applications.

Introduction

A natural, intuitive user experience may harmonize user interactions with data-driven software applications. Such a user experience may mimic the time-honored human tradition of writing onto paper with a pen while incorporating artificial intelligence and machine learning techniques to interpret a user's natural language and other pen-strokes in order to provide real-time insights, ad-hoc analyses, and improve overall usability. In such a user experience, users may work in an intuitive, productive, and familiar fashion.

Figure 1:
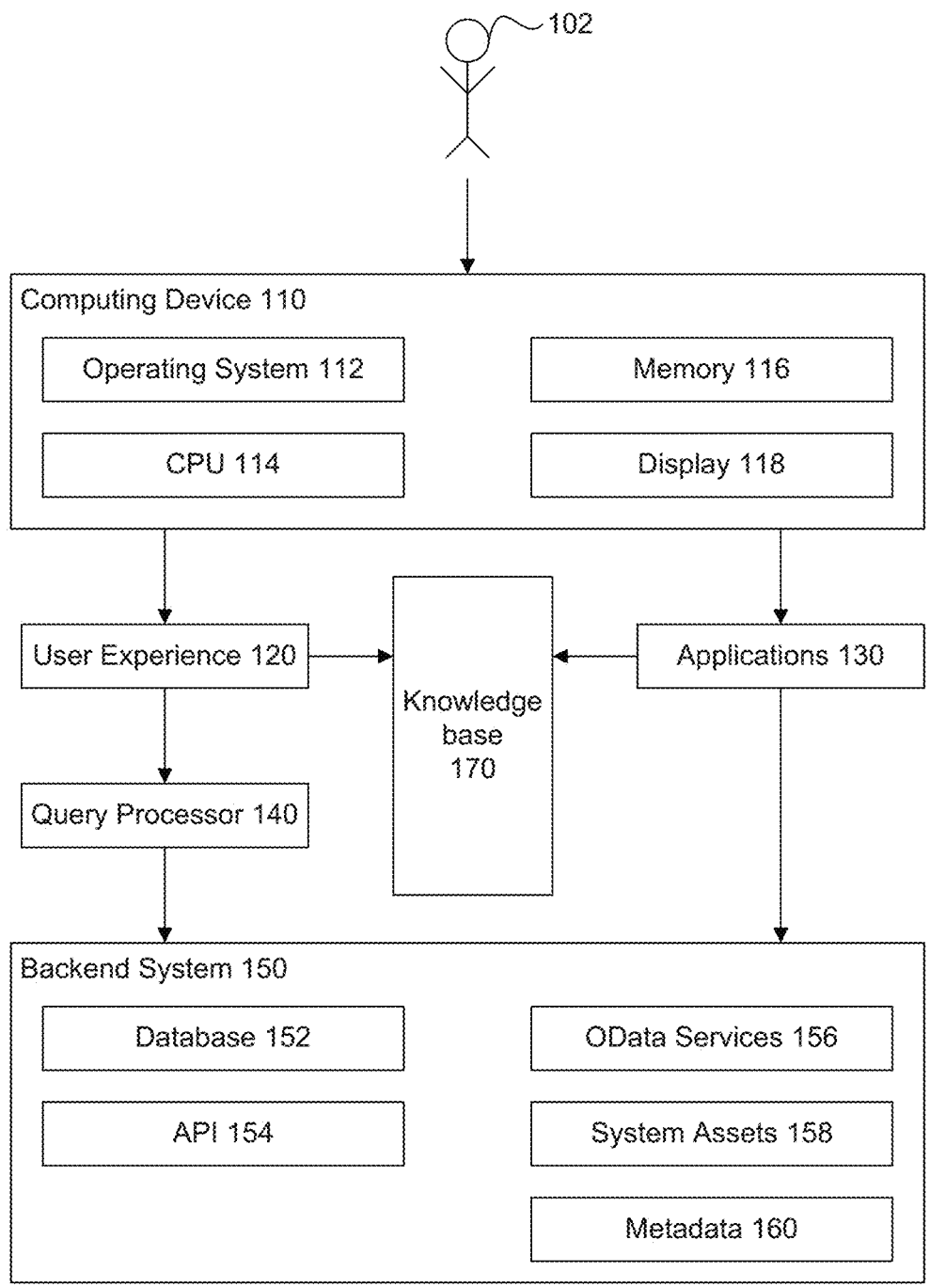
FIG. 1 is a schematic block diagram showing an example system including a user experience and a query processor, according to some embodiments.

FIG. 1 is a schematic block diagram showing an example system 100 including a user 102, computing device 110, user experience 120, applications 130, query processor 140, backend system 150, and knowledge base 170.

User 102 may be an individual or entity using data-driven software applications. User 102 may be a member of a business, organization, or other suitable group using software designed to perform organizational tasks. User 102 may be an individual using software applications for personal pursuits. User 102 may employ, i.e., connect to, a network or combination of networks including the Internet, a local area network (LAN), a wide area network (WAN), a wireless network, a cellular network, or various other types of networks as would be appreciated by a person of ordinary skill in the art. In an embodiment, user 102 may be a c-suite executive using a digital boardroom. In another embodiment, user 102 may be using a launchpad of a suite of software applications. In an embodiment, user 102 may be using a key performance indicator tool.

Computing device 110 may include operating system 112, CPU 114, memory 116, and display 118. Computing device 110 may be a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof. In an embodiment, computing device 110 may be a digital boardroom solution or key performance indicator tool. Although computing device 110 is illustrated in the example of FIG. 1 as a single computer, one skilled in the art(s) will understand that computing device 110 may represent two or more computers in communication with one another. Therefore, it will also be appreciated that any two or more components of system 100 may similarly be executed using some or all of the two or more computers in communication with one another.

User experience 120 may be an interactive front-end, i.e., a natural language user interface, configured to accept natural language queries and other forms of user input. User experience 120 may be shown on display 118 of computing device 110. User experience 120 may adhere to a design paradigm allowing a user to interact with data-driven applications using a pen-and-paper-based concept, one such approach is exhibited below with reference to FIGS. 3A-3E and FIGS. 4A-4L. In one embodiment, user experience 120 may be constructed using standard components (e.g., generic user interface building blocks) and/or custom-developed components to render user-interface display entities, navigational components, and user-interface input elements. User experience 120 may allow user 102 to develop a query that retrieves, accesses, manipulates, and otherwise interacts with data from associated applications. Such a query may receive any combination of direct (SQL or other structured programming language) or indirect (e.g., natural language processing, free-form text, etc.) input means. User experience 120 may accept additional navigation commands in the form of additional natural language, gestures, or other symbolic indications, for example: checkmarks, arrows, circles, stars, highlighting, etc. User experience 120 may be connected to by computing device 110 using a network or combination of networks including the Internet, a local area network (LAN), a wide area network (WAN), a wireless network, a cellular network, or various other types of networks as would be appreciated by a person of ordinary skill in the art. In another embodiment, user experience 120 may be run, configured, installed, or deployed on computing device 110.

In an embodiment, linguistic phenomena, e.g., verbs, phrases, and clauses, entered by user 102 in user experience 120 may act as user-interface controls driving the creation, selection, and modification of data. For example, user 102 may enter natural language to filter displayed data according to criteria. User 102 may perform calculations, summarize data, perform data management, and engage in other appropriate tasks. Other exemplary actions in user experience 120 may include adding parameters, deriving totals, creating a table, appending to or updating data, deleting previously stored queries, etc. In another example, user 102 may sum a column of data in a displayed table by circling that column and writing the word "sum." User experience 120 may interpret user intents behind the commands, retrieve data, and update information on display 118 based on the retrieved data and system assets.

In an embodiment, user experience 120 may use machine learning and modeling techniques to deliver to users a more streamlined and ultimately useful user experience by anticipating user actions and suggesting workflows or data paths based on previous interactions with users. This disclosure describes the use of machine learning techniques further below with reference to FIG. 6.

In an embodiment, user experience 120 may use modelling aspects to interpret the context of the query in order to predict and promote certain resources and services for discovery and to resolve ambiguity in a received input based on the modelling aspects. User experience 120 may perform contextual analysis of an incoming natural language query to identify the intent of the literal text in the natural language query. User experience 120 may enrich a natural language query with contextual information based on an understanding of the user intent when inputting the natural language query. Such enrichment of the natural language query may improve analysis and mapping of the query against relevant business assets and invocations and facilitate ambiguity resolution by user experience 120 of ambiguous inputs from user 102. This disclosure describes the ambiguity resolution further below with reference to FIGS. 7-9.

Applications 130 may be any number of a myriad of data-driven software applications. Applications 130 may be developed and deployed using a variety of technologies and web frameworks and may meet and serve diverse requirements. Applications 130 may be housed on a remote server and delivered over a network to user 102. More than one application in applications 130 may reside on the same remote server, or applications 130 may exist on different servers. User 102 may interact with applications 130 through a web browser or interface such as Chrome, FireFox, etc. User 102 may also interact with applications 130 through a mobile application, desktop application, or other suitable module. Applications 130 may serve a particular function, purpose, or goal, but not necessarily so. Applications 130 may include dynamic interactions with user 102 through user input and data processing, but applications 130 may merely relay information without receiving inputs from user 102. In an embodiment, applications 130 may be a suite of applications accessible to user 102 via a launchpad. In another embodiment, applications 130 may be applications harnessed by or displayed in a digital boardroom. The breadth of functionality provided by applications 130 will be appreciated by one skilled in the relevant art(s) to be expansive and inclusive. Applications 130 may display, compile, harness, etc., data and/or data objects that may be referred to herein as "resources." Resources (e.g., in a database) may be accessed over a network using, for example, the Open Data Protocol (OData) protocol for the querying and updating of data using existing Web protocols. OData, a REST-based protocol for querying and updating data, may be built on standardized technologies such as HTTP, Atom/XML, and JSON.

Query processor 140 may process and answer queries received from user 102, for example, via user experience 120. The queries may be a formal-language query, a natural language query, a navigational expression or symbol, or any combination thereof. Query processor 140 may process the query using services and native calls to create, select, modify, receive, and return data so that the data may be displayed for and interacted with by user 102. Query processor 140 will be described in further detail below with reference to FIG. 2.

Backend system 150 may include database 152, API 154, OData services 156, system assets 158, and metadata 160. Backend system 150 may, for example, be hosted on, or configured as, a networked computing platform in which a server functions as a database server and provides services to store, retrieve, or analyze data (e.g., in database 152, or other networked data sources) as requested by applications 130. Such a networked computing platform may, for example, be implemented on premise or in the cloud and be implemented using commercially available computing platform products or custom-developed tools. Backend system 150 may support services that allow user 102 to develop and execute workflows using data from predefined data stores such as applications, web services, flat-files, databases, etc. The services may allow user 102 to combine, transform, present, and refine that data, and output the results back to the same or different data stores. In another embodiment, backend system 150 may, for example, be hosted or launched on a computing device 110 or another computer. The queries input by user 102 may use services and native calls of backend system 150 to create, select, and or modify data in database 152 and/or objects/protocols in API 154.

Database 152 may be a relational database, a NoSQL database or other horizontally scaling database, or any other database adhering to a suitable database design methodology. Database 152 may harness any commercially available database management system to store data retrievable by applications 130 and query processor 140 or implemented in a custom database management system. In an embodiment, database 152 implements a centralized storage area network (SAN), network-attached storage (NAS), redundant array of independent disks, and/or any other configuration of storage devices to supply sufficient storage capacity to store database tables and supporting structures. Sufficient storage may alternatively exist in any other physically attached magnetic storage, cloud storage, or additional storage medium. In an embodiment, database 152 deploys a hard-disk interface, such as ATA, SATA, SCSI, SAS, and/or fibre for interfacing with storage mediums.

API 154 may be a set of definitions, tools, or protocols that facilitate data interactions between backend system 150 and applications 130/query processor 140. API 154 may, for example, be based on an ODATA application-level protocol. In addition to services furnishing basic data manipulation capabilities (e.g., adding, deleting, and updating), API 154 may provide services to allow the filtering of data and navigation between related entities in backend system 150.

OData services 156 may be a REST-based protocol for querying and updating data in database 152. OData services 156 may be built on standardized technologies such as HTTP, Atom/XML, and JSON. OData, services 156 may provide various functions and standardized data models for use by API 154. For example, OData services 156 may support CRUD (Create, Read, Update, Delete) operations for creating and consuming data in database 152. In an alternate embodiment, OData services 156 may leverage ODBC, JDBC, .NET, or other suitable access methodology in order to provide operations to modify the data contained in database 152.

System assets 158 may be data models, system resources, available services, etc. that user 102 may request and interact with in backend system 150. System assets 158 may include database charts, graphs, tables, and other forms of data. System assets 158 may further include documentation, knowledge bases, or other repositories. In an embodiment, system assets 158 may be updated/inserted/modified using applications 130 or other suitable update method. In an embodiment, system assets 158 and database 152 may be coextensive in some ways and provide similar data and/or functions.

Metadata 160 may be additional information associated with system assets 158. Metadata 160 may be exposed in a suitable format, e.g., XML, JSON, etc. Metadata 160 may describe various other assets, such as documentation, knowledge bases, or other repositories. In an embodiment, metadata 160 may include formal language, e.g., SQL associated with various system assets 158 to be retrieved by query processor 140 in order to select appropriate database from backend system 150 for rendering in user experience 120.

Knowledge base 170 may be used to store structured and unstructured information about interactions between user 102 and user experience 120. Knowledge base 170 may store flows, conclusions, interactions, system assets, external documentation, and other information about these interactions. Knowledge base 170 may store information about the interactions in database tables, XML files, text files, or other appropriate storage mediums. Knowledge base 170 is described in further detail below with reference to FIG. 6.

Figure 2:
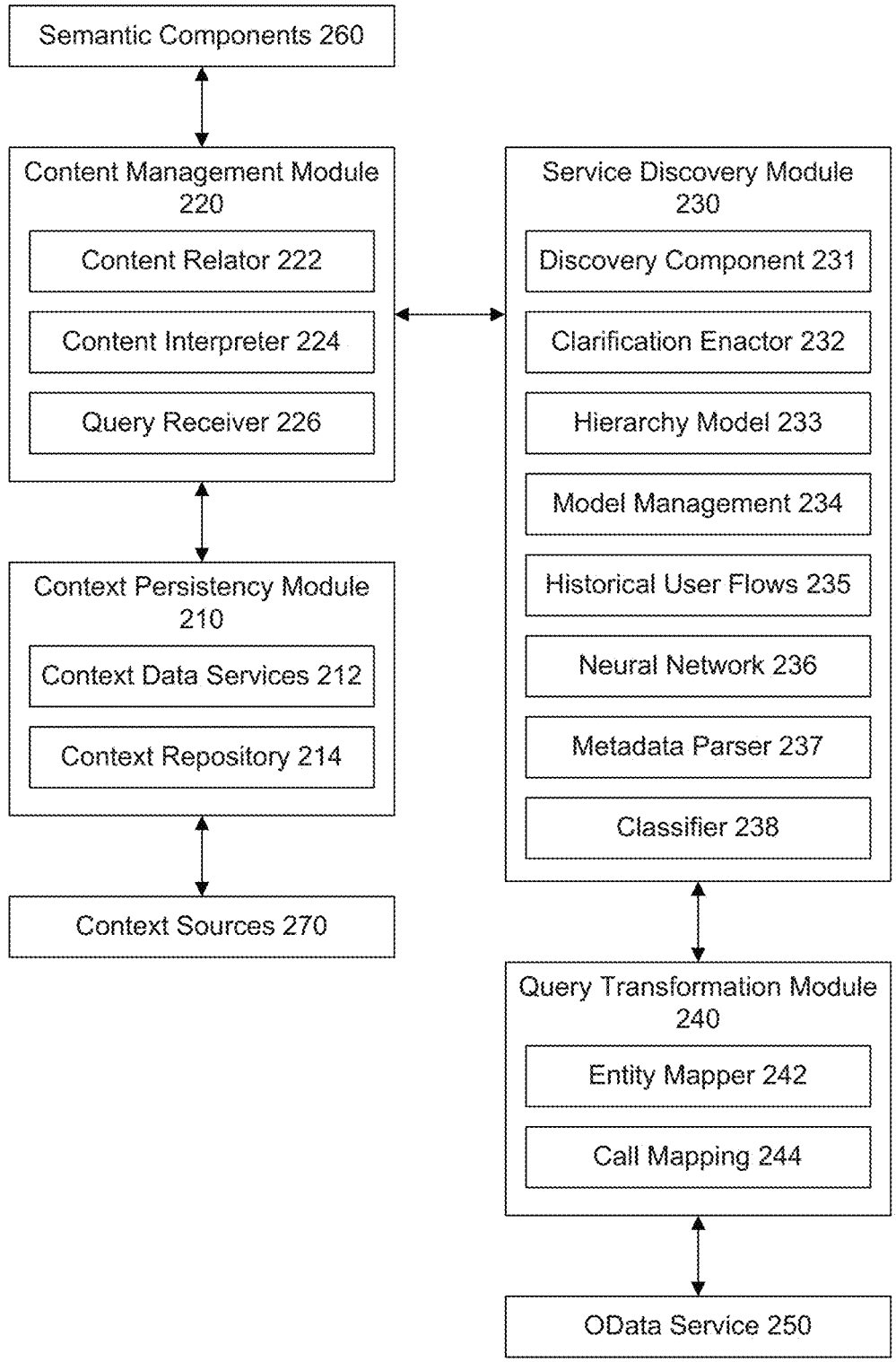
FIG. 2 is a schematic block diagram showing a query processor, according to some embodiments.

FIG. 2 is a block diagram illustrating an example query processor 200, such as query processor 140 described in FIG. 1. Query processor 200 may transform a natural language query entered by user 102 in user experience 120 into a formal, standard, or otherwise runnable system query. Query processor 200 may include: context persistency module 210, content management module 220, service discovery module 230, query transformation module 240, OData services 250, semantic components 260, and context sources 270.

Query processor 200 may perform context and semantic analysis of an incoming natural language query and discover relevant resources and services in backend system 150 in order to process the query and formulate an appropriate response in user experience 120 to provide to user 102. Query processor 200 may transform a natural language query into a query native to the relevant resource or service and invocate, invoke, or call the relevant resource or service, in accordance with the principles of the present disclosure.

Query processor 200 may be coupled to a user experience, such as user experience 120, having one or more user interfaces that an end-user, such as user 102, may use to enter natural language queries directed to, for example, database 152 and/or backend system 150. Query processor 200 may use OData services 156 for standard data operations (e.g., querying and updating data in database 152). For example, classic CRUD (Createt/Read/Update/Delete) operations may be exposed for a business object "saleLineItem" via an OData service.

Further, query processor 200 may perform semantic analysis of the query to determine the meaning of the natural language query (i.e., the subject of the statement, the actions that user 102 wishes to perform, and an appropriate response). A natural language query may be enriched with semantic information based on the determination of the semantic meaning of the query. Like contextual information enrichment, semantic information enrichment of the query may improve analysis and mapping of the query to relevant business assets and service invocations.

For convenience in description of the features and functions of query processor 200, reference is made below to an example procurement scenario in which an enterprise or organization has a contract in place with a supplier to provide a certain number of units of a product. In this example, the contract may be nearing completion, and user 102 must make informed decisions about renewal, renegotiation, etc. In this example procurement scenario, two different items of information may be required by user 102 to make informed contract renewal decisions. Namely, user 102 may require identification of the product within the contract and details of the supplier. In this example, user 102 may use natural language querying to locate these two items without having to use traditional formal-language querying to find the two items of information in backend system 150. User 102 may, for example, submit natural language queries such as "show me product details" and "show me the supplier details" to identify a product and identify a supplier and receive appropriately formulated results from user experience 120. User 102 may subsequently interact further in a similar fashion with the formulated results.

Context persistency module 210 may manage context objects related to natural language queries entered by user 102. Each context object for a query may be stored, calculated, updated, etc. as a delta over others objects in a same session commenced by user 102. Context persistency module 210 may use context data services to receive context data from context sources. Context persistency module 210 may include context data services 212 and context repository 214.

Context data services 212 may retrieve the context data and supply the context data to context persistency module 210. Context data services 212 may associate each natural language query with a contextual object that represents the assets and data surrounding a query to help resolve references in the natural language query to those objects, in accordance with the principles of the present disclosure. In an embodiment, each query may be uniquely identifiable and referable.

Context repository 214 may house or store relevant context objects, system services, and other resources for discovery by query processor 200 based on contextual and semantic enrichments. Context repository 214 may model the natural language query in conjunction with any system modelling of system assets (i.e., services and resources) to establish a link between natural language expressions in the query and system assets and other resources.

Content management module 220 may include content relator 222, content interpreter 224, and query receiver 226. Content management module 220 may be employed by query processor 200 to semantically analyze a natural language statement. Since natural language may be ambiguous, contextual and situational cues may help proper understanding of the natural language. In example implementations, content may be determined in a session in which user 102 is using applications 130.

Content relator 222 may be a service that supplements or completes elements of the query model relating to previous queries or content associated with the query (and stored/retrieved from the context CRUD service). Content relator 222 may output the completed query model as output, for example, to service discovery module 230.

Content interpreter 224 may analyze an incoming natural language query to identify the intent of user 102. Content interpreter 224 may enrich with the natural language based on an understanding of the user intention. Such enrichment of the natural language may improve analysis and mapping of the query against relevant business assets and invocations.

Query receiver 226 may receive a natural language query input from user 102, for example, on a user experience 120. Query receiver may 226 may use or employ a suitable text recognition engine in order to determine the letters, words, symbols, sentences, and other input gestures received from user 102. In response, query receiver 226 may retrieve a current context object for the query. If the current context object does not exist (i.e., it is the beginning of a new session), then content interpreter 224 may retrieve and calculate the current user context from various content data sources. Content interpreter 224 may store and maintain the current session of the query. Further, content interpreter 224 may also then store the current user context. Query receiver 226 may also invoke a semantic component to provide a breakdown of the query into a data model tuple whose entities include subjects, intentions, and criteria. Model entities received from semantic component 260 for the query may be enriched contextually in content management module 220 by content relator 222.

Service discovery module 230 may include discovery component 231, clarification enactor 232, hierarchy model 233, model management 234, historical user flows 235, neural network 236, metadata parser 237, and classifier 238. Service discovery module 350 may be configured to semantically enrich the contextually enriched queries output by content management module 220. Service discovery module 230 may be configured to map the contextually enriched queries received from content management module 220 to actual assets (i.e., services and resources) of the system. The queries may be modeled such that the notion of "supplier" is discoverable both in the context and in the service infrastructure of the system. The contextual services described in the foregoing as provided by content management module 220 may yield a model of a query in terms of a context and a set of query tuples representing a subject—intention—criteria relationships:

{Context, [Subject, Intention, Criteria]}.

Service discovery module 230 may build core descriptions of services and resources and then model and evaluate the descriptions against an incoming natural language query. For example, service discovery module 230 may employ a naïve Bayes method or other suitable classification method to perform the evaluation. In an embodiment, the models may be built on outside sources or documentation.

Discovery component 231 may be employed by query processor 200 to discover, track, and/or catalog available services, such as OData services 156, system assets 158, and metadata 160 in backend system 150 that query processor 200 may use to retrieve data, information, and assets. Discovery component 231 may analyze service descriptions and related assets, for example core data services views, virtual data model views, etc., to build a description-based classification network that enables identification of a database object and/or service that may be called or invoked to process the queries. In some instances, user 102 may submit follow-up queries to an original natural language query. In an embodiment, to process such a follow-up query, query processor 200 may use external data sources in a business situation framework.

Clarification enactor 232 may receive additional information from user 102 when ambiguous natural language or other input is received from user 102. In some situations, ambiguous natural language may be resolved by examining information in service discovery module 230. However, in other situations, ambiguity in the natural language may not be resolved based on existing information. In such a situation, clarification enactor 232 may prompt user 102 for assistance in resolving the ambiguity. Clarification enactor 232 may present an appropriate graphical cue to user 102 in user experience 120. For instance, if multiple system assets are identified, user 102 may receive a prompt requesting a manual selection of one of the system assets.

Hierarchy model 233 may store and rank available system assets as mapped to various natural language statements. Hierarchy model 233 may rank available assets and/or actions using an appropriate hierarchical model, such as ranking actions on a scale of 1-10, assigning a percentage of effectiveness, etc. In some embodiments, hierarchy model 233 may be used by query processor 200 to resolve situations where more than one system asset is identified as being pertinent to the entered natural language query. In such an embodiment, hierarchy model may identify one asset as being more appropriate than others based on the rankings.

Model management 234 may store, update, modify, delete, track, etc. models used by service discovery module 230. Model management 234 may update stored models based on interactions with user 102 in user experience 120.

Historical user flows 235 may be employed by query processor 200 to track previous interactions with user 102. For example, historical user flows may track previous queries entered by user 102 and actions engaged in after processing those queries.

Neural network 236 may be employed by query processor 200 to improve the performance of service discovery module 230 over time by examining tasks and results.

Metadata parser 237 may be employed by query processor 200 to receive additional information about system assets 158 after identified. For example, query processor 200 may receive from metadata 160 appropriate formal language for execution following the identification of an appropriate system asset based on the received informal natural language. For example, metadata parser 237 may receive a formal SQL query of "select * from DetailsOfProduct where Product=[ ]" after query processor 200 determines the appropriate system assets related to a natural language query of "show me product details."

Classifier 238 may identify to which category a recent observation of the behavior of user 102 belongs. Example categories may include positive/negative interactions, appropriate actions, or sentiments.

Query transformation module 240 may transform a natural language query into a formal querying language to be used to be retrieve data from backend system 150. Query transformation module 240 may employ entity mapper 242 and call mapping 244 in order to determine appropriate formal language based on entered natural language.

Entity mapper 242 may model the natural language queries as basic entity tuples [Subject (or Topic), Intent, Criteria], where each tuple element resolves to database object model references. Each tuple element may be then mapped to a particular service call which may perform the intention on the subject with the given criteria.

Call mapping 244 may model a natural language query based on grammar, i.e., a construct having a subject, an optional auxiliary verb, a main verb, and qualifiers. The verb usage in the natural language query may indicate the intent of the query. Call mapping 244 may match the topics or subjects of the natural language query to objects in backend system 150, verbs to operations, and qualifiers to filters to determine which services should be invoked to answer the query. For example, a natural language query of "show my sales from my suppliers" may be modeled as a set of subjects and verbs, such as:

[SaleLineItem, read] WHERE [suppliers=userID].

A natural language query may or may not explicitly state the subject in terms of a database object. In some examples, the query may state a token that represents an instance of the database object, for example, the natural language query may refer to "XYZ" as a name of a company rather than as a "Company" object.

OData services 250 may be a REST-based protocol for querying and updating data. OData services 250 may be built on standardized technologies such as HTTP, Atom/XML, and JSON. OData services 250 may provide various functions and standardized data models to be used by API 154. For example, OData services 250 may support CRUD (Create, Read, Update, Delete) operations for creating and consuming data. In an alternate embodiment, OData services 250 may leverage ODBC, JDBC, .NET, or other suitable access methodology. Query processor 200 may use OData services 250 to expose an operation (i.e., an action that may take place on the modeled resource), the criteria or qualifiers of the operation (e.g., filters), and on which objects the action is to take place (i.e. the service itself).

Semantic components 260 may perform semantic analyses of the query to determine the meaning of the natural language query. A natural language query may be enriched with semantic information based on the determination of the semantic meaning of the query. Like contextual information enrichment, semantic information enrichment of the query may improve analysis and mapping of the query against relevant business assets and service invocations.

Context sources 270 may provide context contextual and situational cues toward proper understanding of the incoming natural language query. Context sources 270 may, for example, include one or more context data sources, for example, documentation, knowledge bases or repositories of articles that provide knowledge on specific topics, and other documentation. Context sources 270 may include: (1) system context data including, for example, data emanating from the system, situations produced by the system, business events present, financial periods, state changes to business objects, etc.; (2) user context data including, for example, habits data, user interface interactions, business objects made by the user, actions of the user on the objects (e.g., viewed, modified, or shared), situations faced by the user, etc.; and (3) personal data (e.g., authorization, apps used, task assigned, organizational role or structure, etc.). In example implementations, query processor 200 may use the following sources for contextual information: S/4 Situations, log files, and user identity systems (authorizations, roles, etc.)

Context sources 270 may assist query processor 200 in resolving the meaning of a natural language utterance in a natural language query. Context sources 270 may include different kinds of data from various sources (e.g., the system itself yielding authorizations or available apps of a user). Context sources 270 may be a previous query (queries made within a particular session) which may be helpful to resolve the meaning of expressions referring to entities (such as "it", "that", "he/she", etc.). For example, if user 102 entered a query such as "show me that supplier" or "OK. Show me its address," context sources 270 may help to resolve the meaning of "that" or "its." To resolve the meaning of such expressions, the queries may provide a notion of state and session.

Digital Paper Based Interaction to System Data

An input mechanism in such a pen-and-paper user experience may be a pen, stylus, input gesture, or other suitable mechanism for expressing a user intentions. A user, such as user 102 described above, may write, draw, paint, doodle, sketch, mark, or otherwise express themselves using the input mechanism. For example, a user may write natural language requesting data or information without the requirement that the language conform to a formal querying language such as SQL, XQuery, etc. A user experience may interpret the entered natural language and then retrieve and display appropriate tables, charts, graphs, or raw data based on the interpreted natural language. A user may also enter non-language based constructs, i.e., symbolic inputs using the input mechanism. Such symbolic inputs may be interpreted by the user experience in order to provide navigation controls and facilitate further interactions with displayed data. Such symbolic inputs may include drawing checkmarks, circles, squares, lines, and other geographic symbols, swiping, clicking, tapping, dragging, and other gestures.

The user experience may allow the user to interact directly with retrieved and displayed tables, charts, graphs, or raw data through the entry of additional natural language as well as additional symbolic inputs. For example, a user may draw on or around the data elements (graphs, tables, raw-data), or provide other decipherable, pen-stroke inputs in the margins. Such interactions may include, just for example: adding records to or removing records from a table, chart or graph, selecting records, drilling down further into the tables or charts, sorting or grouping data, highlighting a particular row of a table, changing the dimension or record set of a graph or chart, swiping to indicate a filtering range, etc. In another exemplary action, a user may draw arrows between a particular piece of data in a table and another piece of data in that table requesting a comparison between data elements. In another example, the user may draw arrows between data elements in two distinct tables in order to request a comparison or other suitable action. In an embodiment, a user may navigate through various components within an application or navigate among applications in a suite of applications using similar input mechanisms. Exemplary interactions with data in user experience 120 are described in further detail below with reference to FIGS. 4A-4L.

FIGS. 3A-3E are examples of screen display 300 of an exemplary user experience as rendered on computing device, such as computing device 110, according to some embodiments. Screen display 300 may include input area 302, title 304, command 306, result 308, and reports 310. The screen displays provided in FIGS. 3A-3E are merely exemplary, and one skilled in the relevant art(s) will appreciate that many approaches may be taken to provide a suitable screen display 300 in accordance with this disclosure.

Input area 302 may provide user 102 a location to input natural language statements, enter navigational controls, gestures, and symbols, and express other suitable intents. User experience 120 may use a design paradigm where input area 302 resembles a piece of paper, graphing paper, notebook, or other paper-like receiver of written language. Input area 302, may include additional configuration options allowing user 102 to tailor the look and feel to their own unique requirements and habits. For example, user 102 may be able to configure input area 302 to change the preferred thickness of written inputs, show/hide various fields, create and/or select from appropriate color schemes, etc.

Title 304 may be a name or title describing a series of interactions between user 102 and user experience 120. In other words, by entering natural language commands and other navigational symbols, user 102 may create a report or set of instructions that may be recalled at a later time for further viewing and interaction with. User experience 120 may catalog the interaction between user 102 and user experience 120 for later recall using title 304. Title 304 may display as pen-written natural language, typeface, symbols, images, pictures, or other suitable construct. In an embodiment, user 102 may enter the title and store the title with a report or subsequent set of natural language query and associated actions. In an alternate embodiment, user experience 120 may determine an appropriate title based on the date, contextual information, or via another suitable methodology.

Command 306 may be a natural language statement written by user 102 to be interpreted by query processor 200. Command 306 may also be a geometrical symbol, character, or other pen-stroke to be interpreted by user experience 120. Command 306 may persist, i.e., remain on display in input area 302 as user 102 subsequently interacts with retrieved data and enters other commands. In another embodiment, command 306 may clear or reset once user experience 120 retrieves the data. In another embodiment, command 306 may be cleared by user 102 expressly through an appropriate user input.

Result 308 may be a table, chart, graph, or raw data retrieved by user experience 120 from backend system 150 in response to command 306 or other user-indicated input. Result 308 may be rendered and displayed by user experience 120 based on data retrieved by query processor 200 from backend system 150. In an alternate embodiment, the displayed chart, graph, or table may be retrieved as an image file or other binary file from API 154 and/or system assets 158 and re-displayed within user experience 120.

Reports 310 may be interactions between user 102 and user experience 120 stored in an appropriate fashion and made available for later recall. User experience 120 may store and organize reports 310 based on name, time of creation, date of creation, or by any other suitable mechanism. Reports 310 may be deleted by user 102. Reports 310 may store or catalogue user interactions by title 304, as described above.

Navigation control 312 may be a circle, square, or other shape that receives navigational inputs from user 102 for interpretation by user experience 120. In an embodiment, navigation control 312 may be a circle, and user 102 may indicate with a checkmark that the user entered changes should be processed by user experience 120. For example, user 102 may enter multiple natural language statements and other symbolic gestures into input area 302, and user experience 120 may not process these additional statements until user 102 enters the checkmark in navigation control 312. Other example interactions may include the entry by user 102 of an "X" in the circle to indicate that the recent actions should be removed, the movement the circle around the screen, or an input of natural language directly in the circle. These examples are merely illustrative and one skilled in the arts will appreciate the myriad of inputs and interactions that may be received by navigation control 312, in another embodiment, navigation control 312 may not be displayed or may be hidden by user 102 such that the navigational inputs and natural language may be entered by user 102 anywhere on input area 302.

Figure 3A:
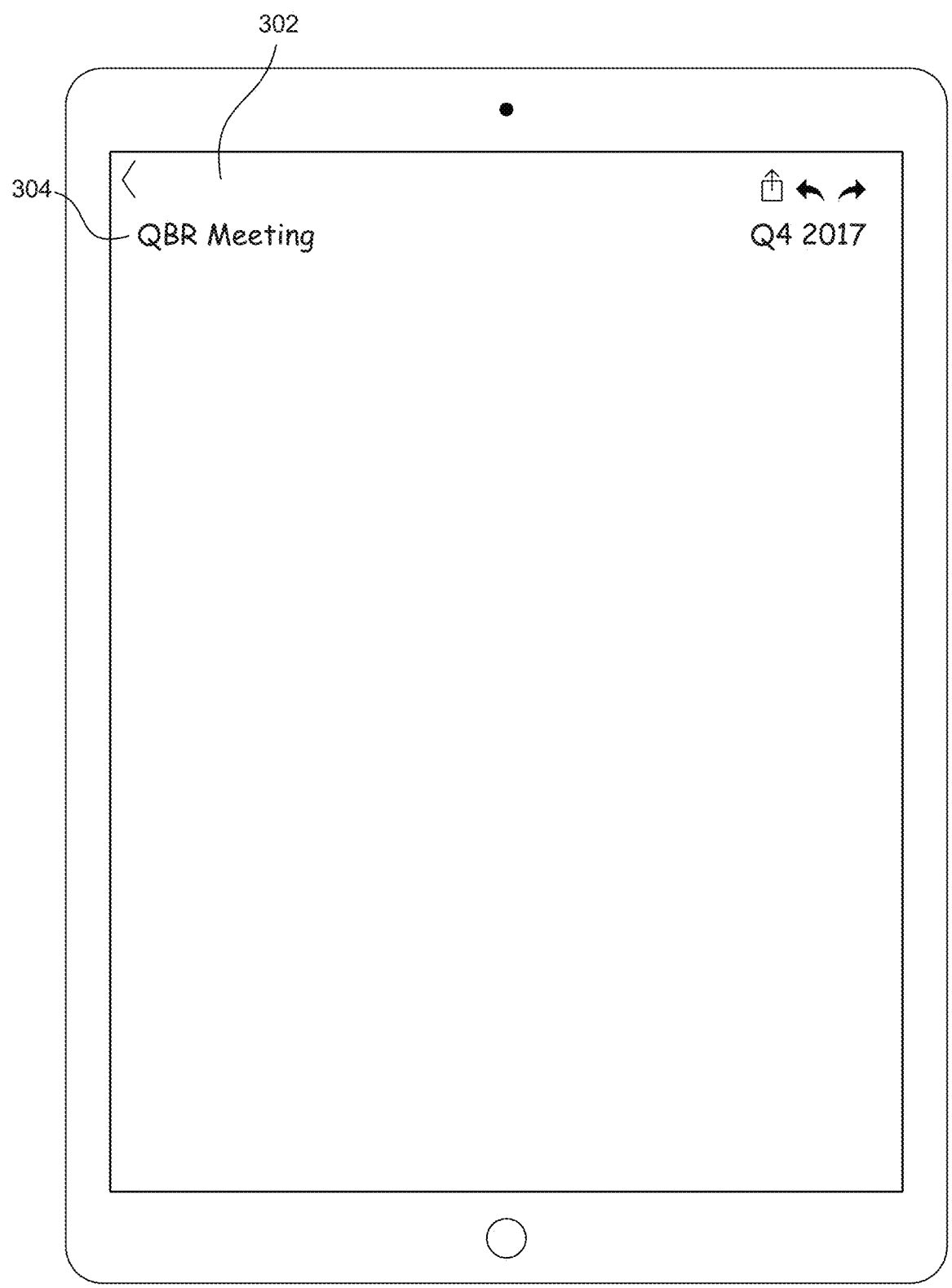
FIGS. 3A-3E are example screen displays of an exemplary user experience, according to some embodiments.

In the example provided in FIG. 3A, input area 302 displays and is initialized as a blank page. Title 304 in this exemplary screen display 300 displays "QBR Meeting," as entered by user 102. User 102 may enter input in natural language or navigational commands in input area 302. No command 306 is displayed because user 102 has not yet entered any natural language or other symbols.

Figure 3B:
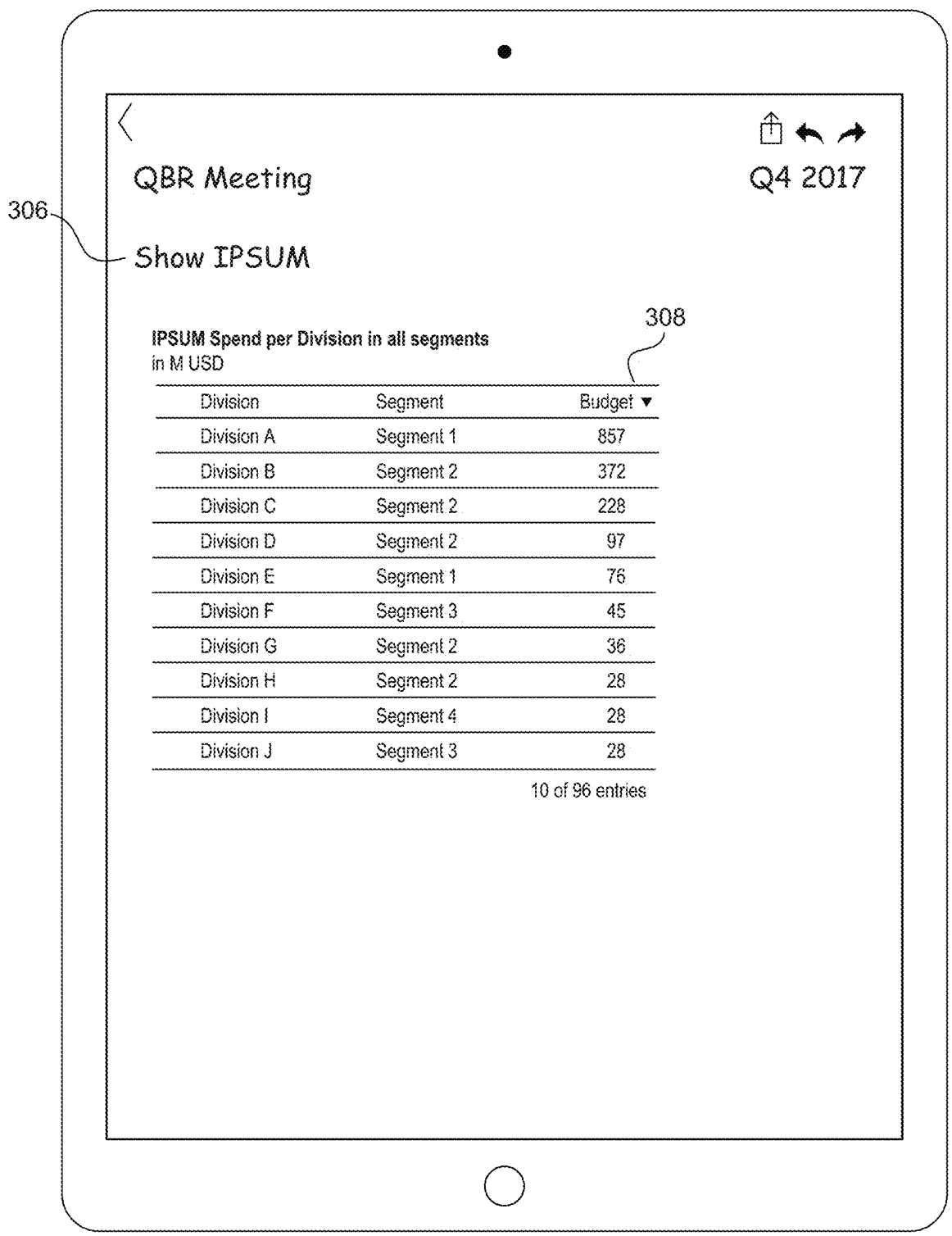

In the example provided in FIG. 3B, user 102 entered the natural language "Show IPSUM" as command 306. Query processor 200 determined an appropriate interpretation for command 306 and interfaced with backend system 150, database 152, API 154, and/or system assets 158 in order to display result 308. In FIG. 3B, result 308 is a table with budget information for "IPSUM" displaying multiple columns and rows reflecting the data pulled from or received via backend system 150, database 152, API 154, and/or system assets 158. In this example, result 308 includes a title for the table, "IPSUM Spend per Division in all segments." Result 308 also includes about multiple columns, i.e., "Segment" and "Budget" for each displayed "Division." The data in result 308 as displayed in FIG. 3B includes integers and strings, however, any suitable data format may be retrieved and displayed in such a table. Such data formats may include dates, currency values, characters, Booleans, text, etc. One skilled in the relevant art(s) will appreciate, moreover, that this table is merely exemplary, and result 308 may be displayed in a variety of table formats in addition to being displayed as a chart, graph, raw data, or other appropriate visualization.

Figure 3C:
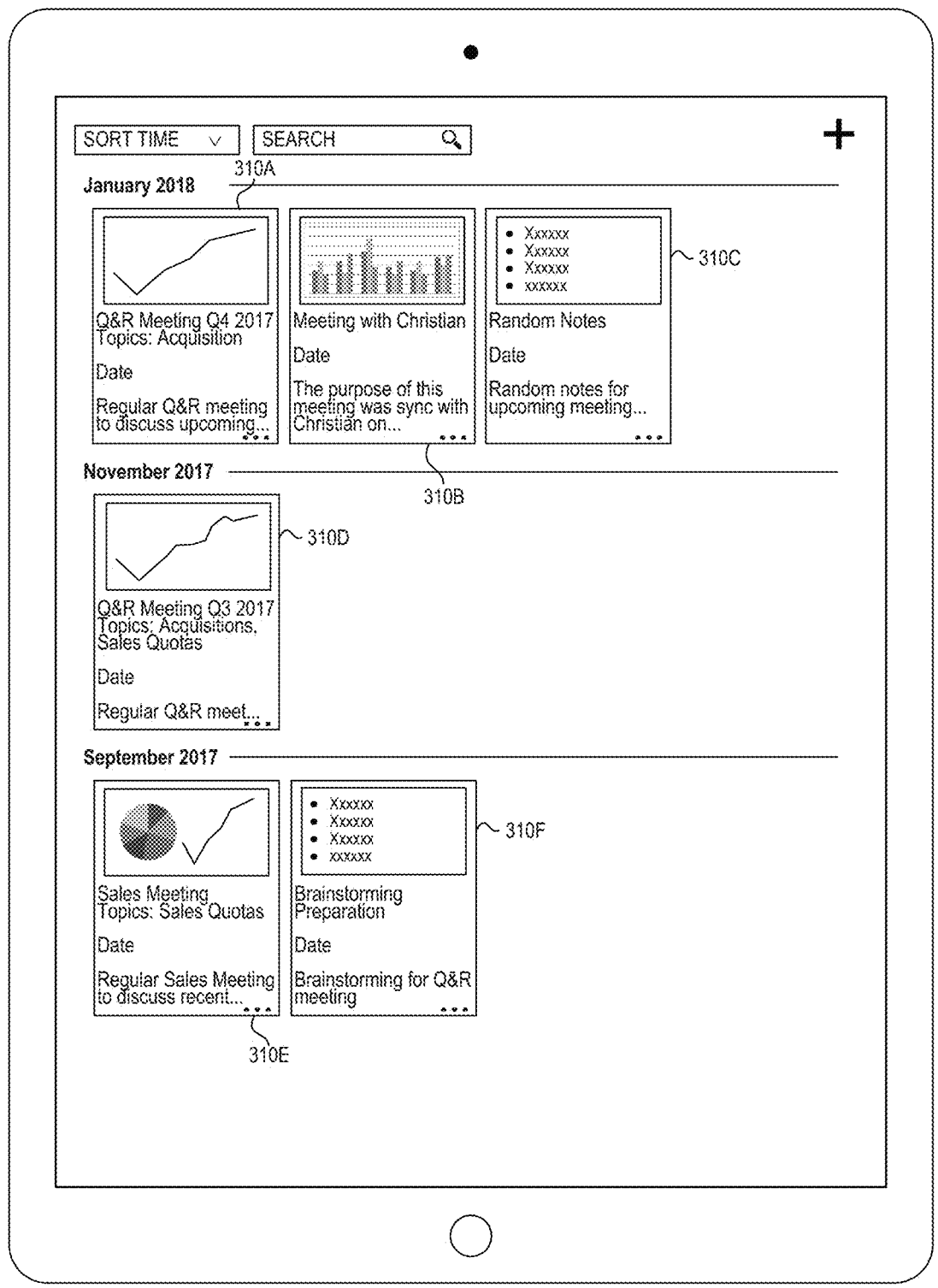

In the example provided in FIG. 3C, reports 310 display. Reports 310 may be saved previous interactions between user 102 and user experience 120. Reports 310 may be thought of as stored versions of interactions similar to those displayed in FIGS. 3A-3B. Reports 310 may be stored in historical user flows 235 and used in determining appropriate interpretations of subsequent user queries. Reports 310 may be catalogued by title 304 and organized by date, as displayed in FIG. 3C. In an embodiment, a plus symbol or other suitable visual cue may be employed to allow user 102 to navigate to a new report, i.e., a blank input area 302 as displayed in FIG. 3A.

Figure 3D:
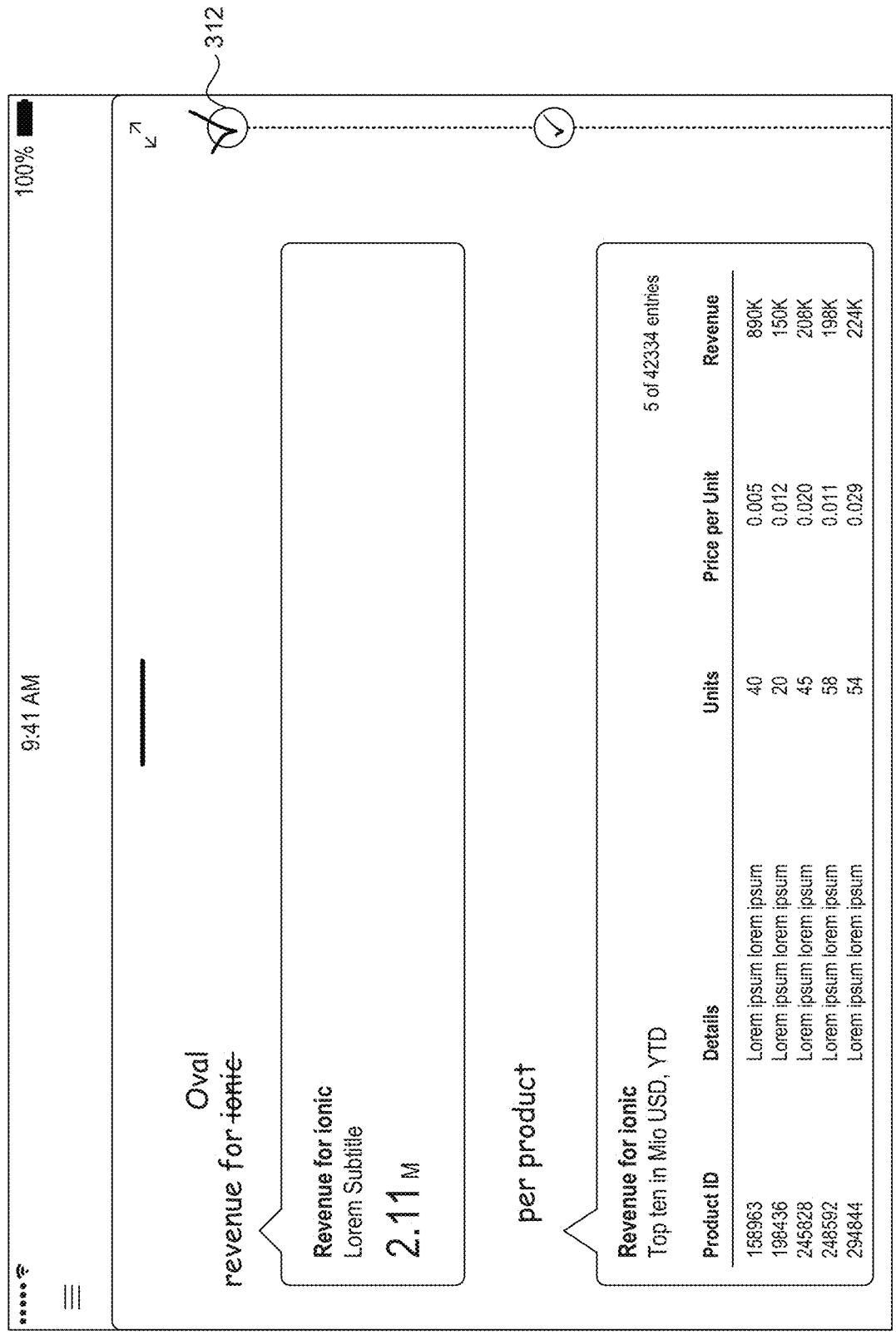

In the example provided in FIG. 3D, another interaction between user 102 and user experience 120 is displayed. User 102 initially entered command 306 as "revenue for ionic." Result 308 shows appropriate result that user experience 120 receive for "ionic," specifically displaying a revenue for "ionic" of "2.11M." User 102 subsequently entered natural language reading "per product," and user experience 120 retrieved a "Revenue for ionic" table indicating the revenue for "ionic" broken down into various products. Next, user 102 scratched out "ionic" in the originally entered command 306 of "revenue for ionic" and wrote "Oval" to replace "ionic." User 102 also wrote a checkmark in navigation control 312. The results of these actions conducted by user 102 will be displayed in FIG. 3E.

Figure 3E:
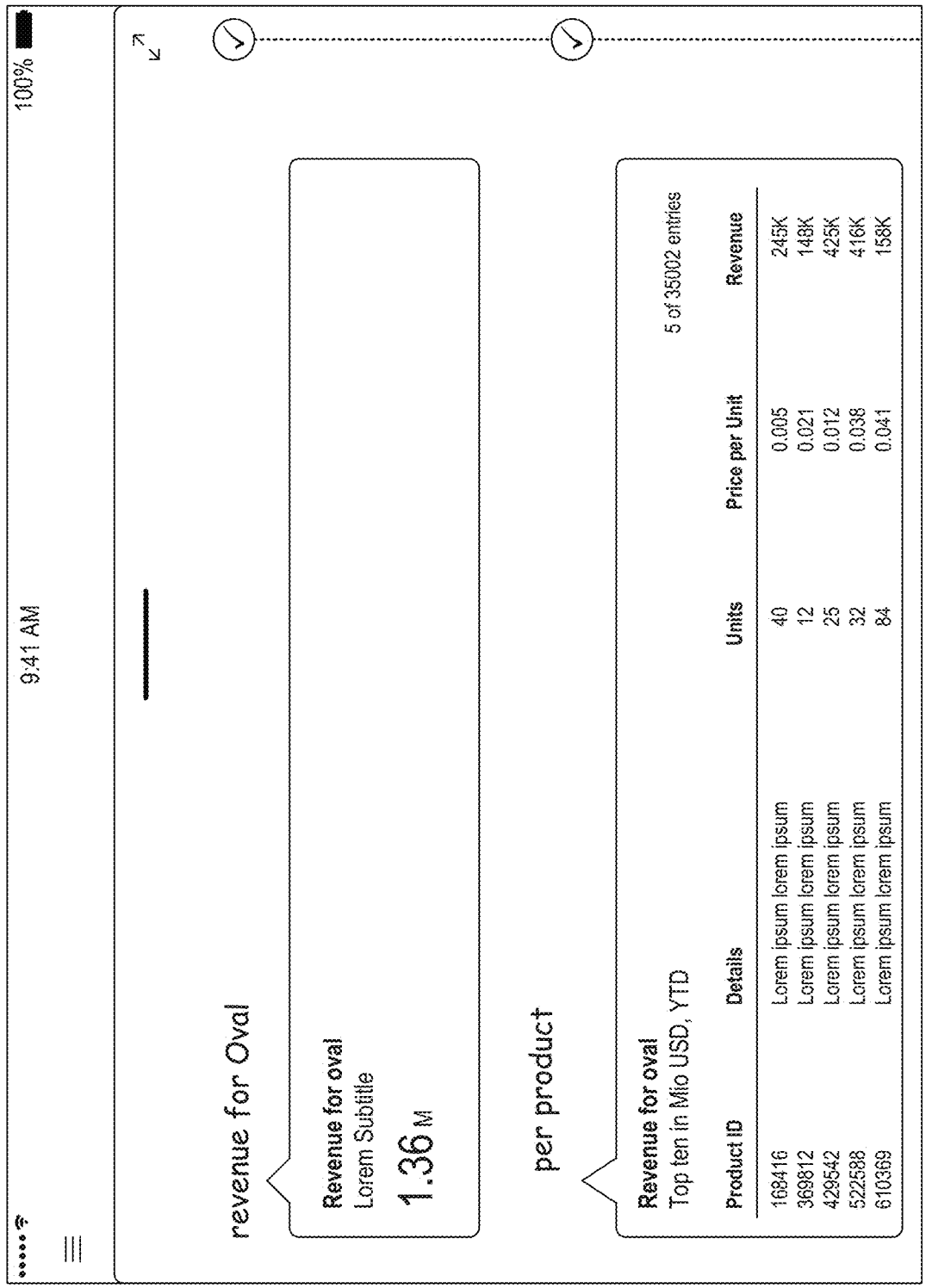

In the example provided in FIG. 3E, user experience 120 changes the data in result 308 based on user 102's inputs. Result 308 now displays data for "Oval" based on the intent expressed by user 102 in FIG. 3D. User experience 120 updated both the original revenue number and the per-product breakdown. The actions performed by user experience 120 in these instances are merely exemplary.

FIGS. 4A-4L, are examples of screen display 400 of exemplary user interactions in an user experience 120, according to some embodiments. FIGS. 4A-4L detail interactions with result 308 by user 102 with data queried or retrieved by user experience 120 and/or query processor 200 from backend system 150 and displayed in user experience 120. The screen displays provided in FIGS. 4A-4L are merely exemplary, and one skilled in the relevant art(s) will appreciate that many approaches may be taken to provide a suitable screen display 400 in accordance with this disclosure.

Manipulable result 402, are tables, charts, raw data, graphs, or other suitable data visualizations, similar to those described above as result 308, that are provided by user experience 120 to user 102. Manipulable result 402 allows user 102 to provide additional inputs, retrieve additional data, modify the underlying natural language/formal query, filter the data, sort the data, insert/update/delete records from the underlying data, and otherwise interact with the data. Manipulable result 402 may be rendered by user experience 120 as tables, charts, graphs, raw data, or other suitable visualizations. User 102 may interact with manipulate result 402 in a myriad of ways, for example, requesting calculations, summarizing data, adding parameters, deriving totals, appending to data, updating data, deleting rows/columns, etc. The examples in FIGS. 4A-4L indicate several of the myriad of interactions that user 102 may have with manipulable result 402, however, these descriptions are in no way exhaustive. One skilled in the arts will appreciate that many additional methods of interaction may occur between user 102 and manipulable result 402.

Figures 4A, 4B:
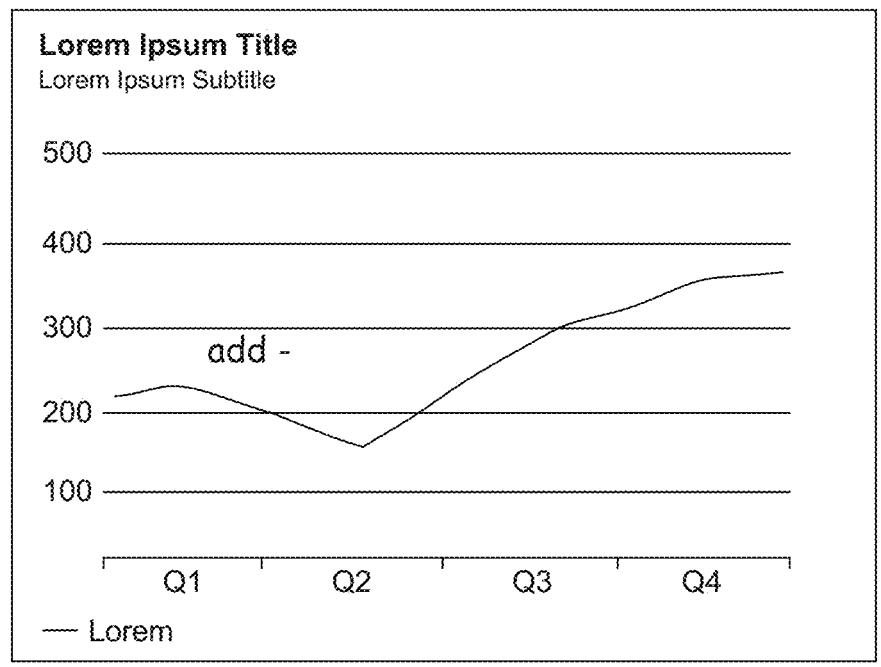

In the example provided in FIG. 4A, manipulable result 402 is a table, and user 102 writes the word "add" in the table. In an embodiment, user experience 120 may complete a subsequent action, for example, allowing user 102 to add additional data to the data set displayed in manipulable result 402.

In the example provided in FIG. 4B, manipulable result 402 is a line graph, and user 102 writes the word "add" in the line graph, in an embodiment, user experience 120 may complete a subsequent action, for example, adding data to the data set or allowing user 102 to add additional data to the data set displayed in manipulable result 402.

Figures 4C, 4D:
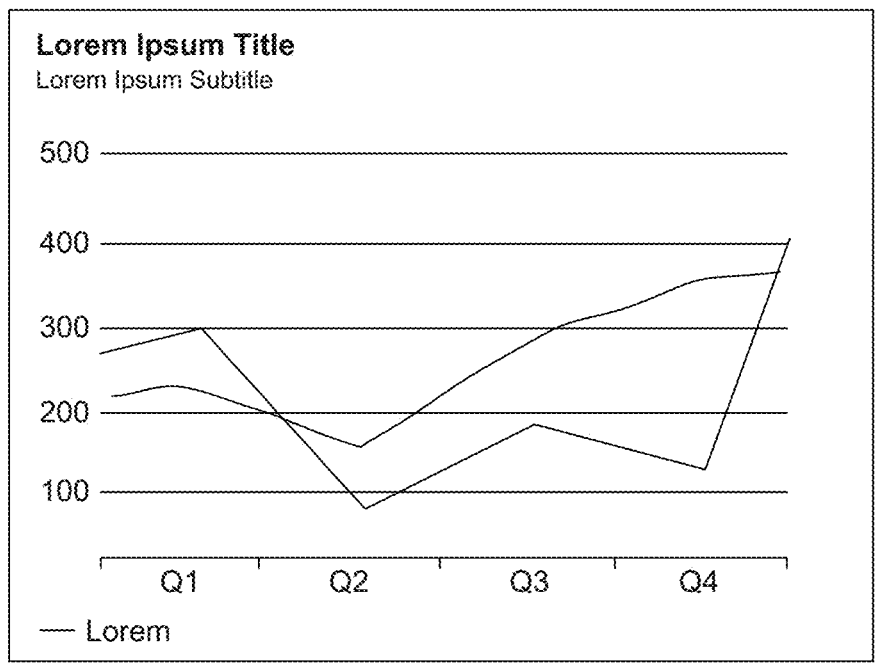

In the example provided in FIG. 4C, manipulable result 402 is a table, and user 102 scratches out a column header in the table. In an embodiment, user experience 120 may subsequently remove that column from the table displayed in result 308 and re-display result 308.

In the example provided in FIG. 4D, manipulable result 402 is a line graph with two result sets displayed, and user 102 scratches out the label for one of the result sets. In an embodiment, user experience 120 may subsequently remove that data item from result 308 and re-display result 308.

Figures 4E, 4F:
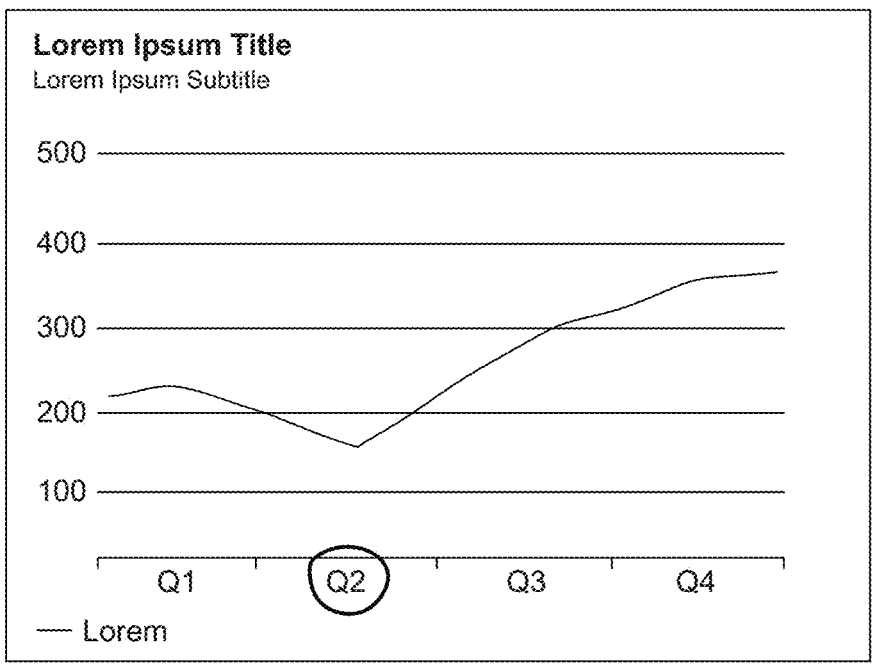

In the example provided in FIG. 4E, manipulable result 402 is a table, and user 102 circles a particular piece of data in the table. In an embodiment, user experience 120 may subsequently provide more information about that particular piece of data, re-render the table to display additional data associated with the circled data piece, or perform another suitable action within user experience 120.

In the example provided in FIG. 4F, manipulable result 402 is a line graph displaying data for quarters Q1, Q2, Q3, and Q4, and user 102 circles a particular quarter, Q2. In an embodiment, user experience 120 may subsequently re-render the graph to display only information about Q2, may provide additional table information about Q2, or perform another appropriate action within user experience 120.

Figures 4G, 4H:
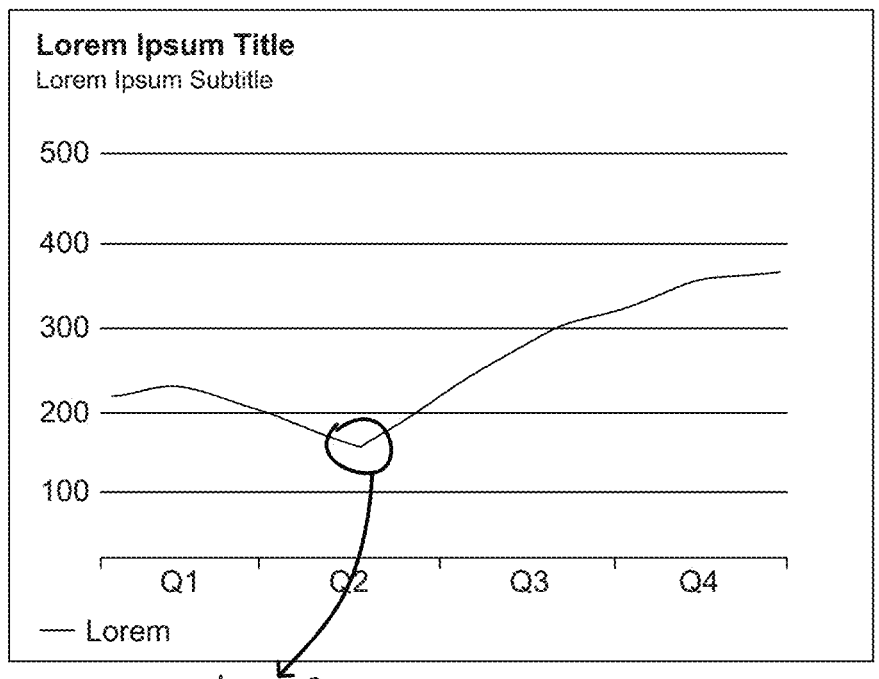

In the example provided in FIG. 4G, manipulable result 402 is a table, and user 102 circles a particular piece of data in the table, draws a line to the margin, and writes natural language "lorem?". In an embodiment, user experience 120 may subsequently interpret the entered natural language "lorem?" within the context of the circled data point and provide updated information, retrieve additional information, perform a navigation action within user experience 120 or perform any other suitable action based on the expressed user intent.

In the example provided in FIG. 4H, manipulable result 402 is a line graph, and user 102 circles a particular data point in the line graph, draws an arrow to the margin, and writes natural language "lorem?" In an embodiment, user experience 120 may interpret the language in the context of the data point and update the query appropriate or perform other appropriate action.

In the example provided in FIG. 4I, manipulable result 402 is a table, and user 102 sorts by a column. In an embodiment, user 102 may mark, click, input on, or swipe on the column header (here "value") in order to sort by the column. User experience 120 may subsequently update the table in order to display the data in the sorted fashion. In an embodiment, query processor 200 may reformulate and process formal language queries using an appropriate "order by" clause or other similar construct.

in the example provided in FIG. 4J, manipulable result 402 is a table, and user 102 selects an entire row by writing a checkmark. In an embodiment, user experience 120 may provide additional information about that row, re-render the table to display additional data relevant to the circled row, or perform another suitable action within user experience 120.

Figure 4K:
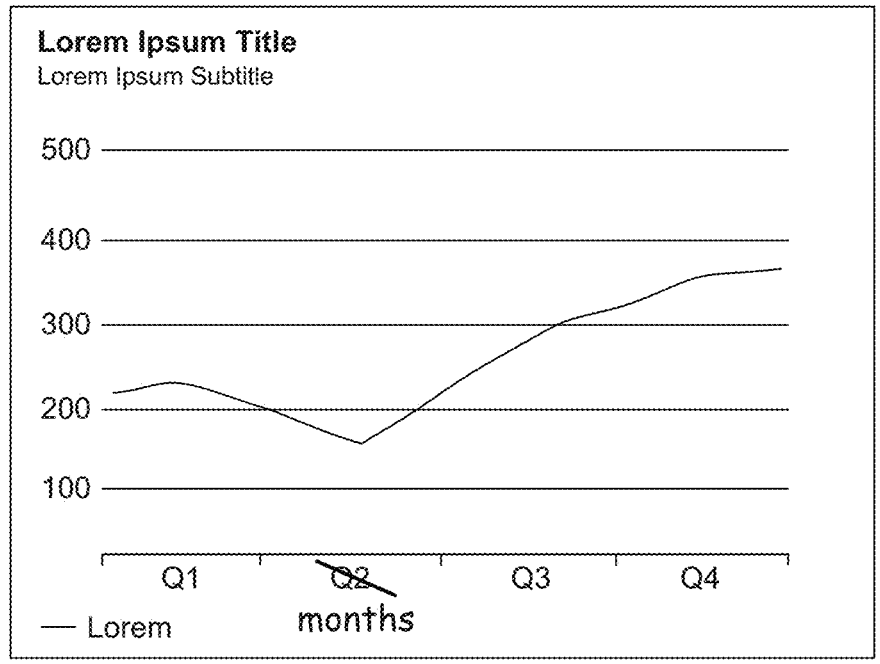

In the example provided in FIG. 4K, manipulable result 402 is a line graph displaying data for quarters Q1, Q2, Q3, and Q4, and user 102 writes natural language "months" over the Q1, Q2, Q3, and Q4 column labels. User experience 120 may re-render the displayed chart with the horizontal axis consisting of data dividing into calendar months instead of data for the quarters. In an embodiment, query processor 200 may reformulate and process formal language queries using an appropriate "group by" clause or other similar construct.

Figure 4L:
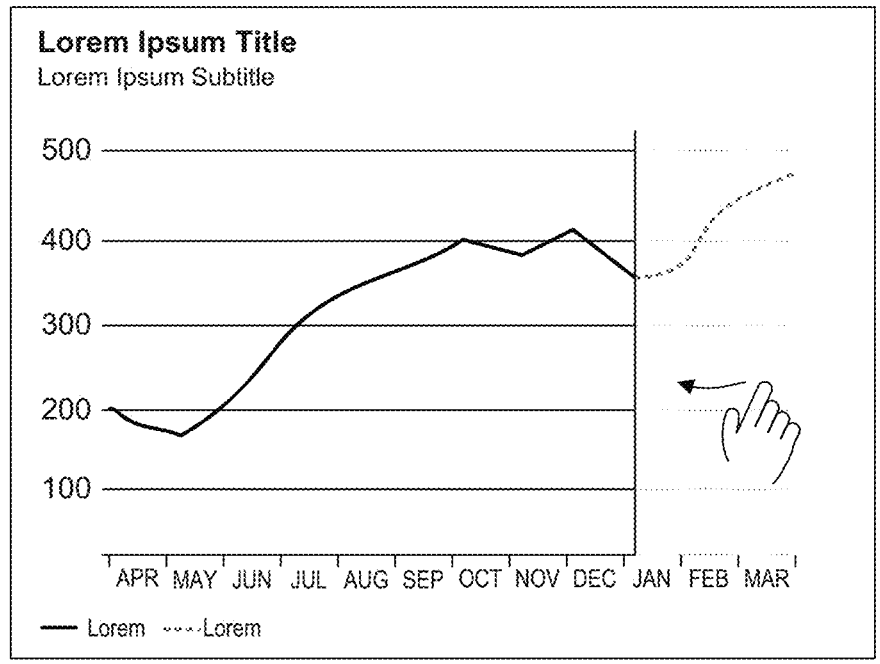

In the example provided in FIG. 4L, manipulable result 402 is a line graph displaying data for months Apr-Mar, and user 102 indicates that the result set should end at "Dec." User experience may retrieve updated information and re-render result 308 such that the chart only displays data from Apr-Dec. In an embodiment, query processor 200 may reformulate and process formal language queries using an appropriate "where" clause or other similar construct.

Figure 5:
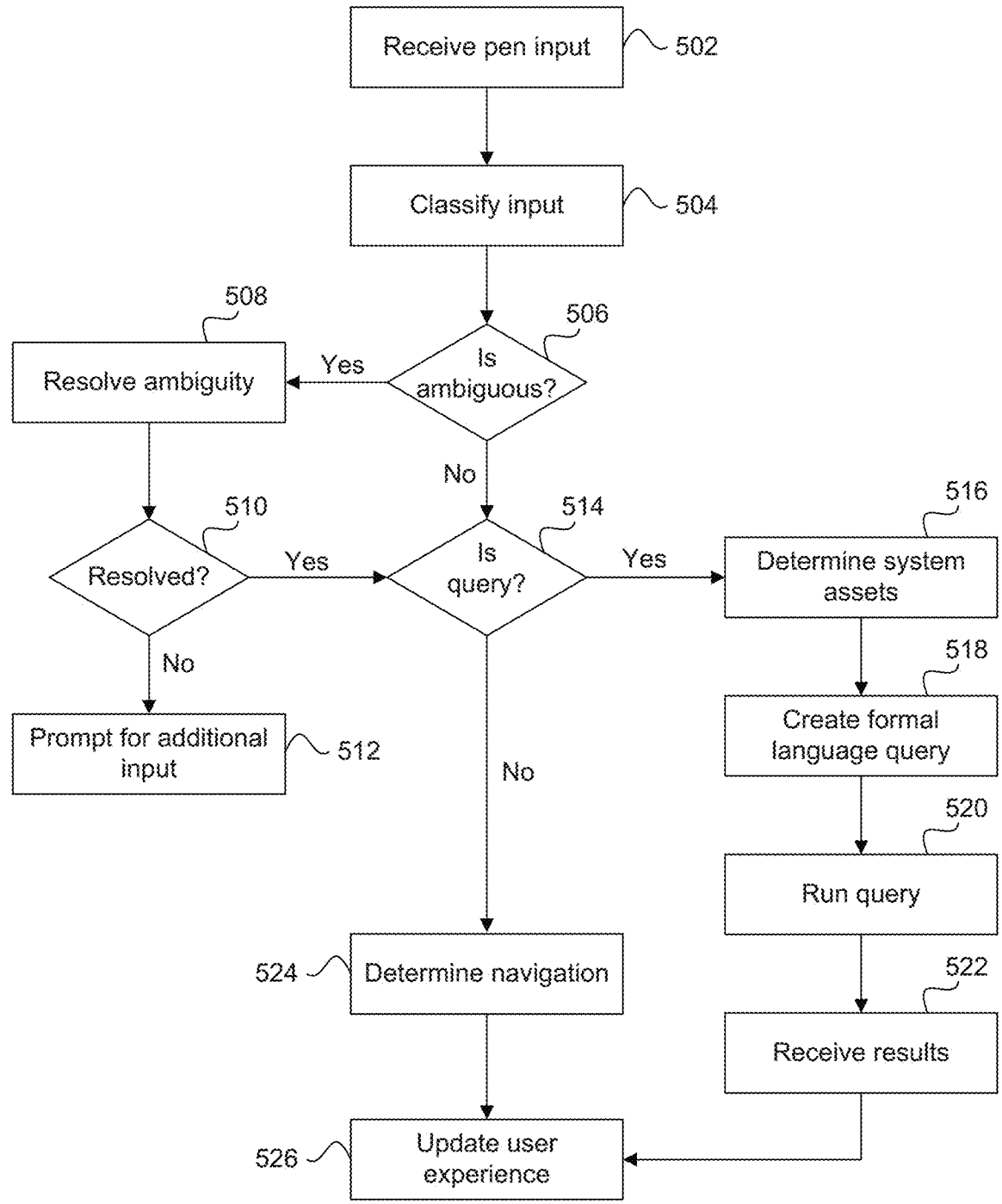
FIG. 5 is a flowchart illustrating a method for classifying a pen input and determining associated system assets and appropriate actions in a user experience, according to some embodiments.

FIG. 5 illustrates a method 500 for classifying a pen input and determining associated system assets and appropriate actions in a user experience, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art(s).

In 502, user experience 120 may receive an input from user 102 via computing device 110. In an embodiment, the input may be a character, word, phrase, sentence fragment, sentence, symbol, gesture, or other suitable entry created using a pen-like input. The pen input may be entered by user 102 using a pen, stylus, input gesture, or other suitable mechanism for writing. User 102 may write natural language indicating a request for data or information. For example, user 102 may write natural language, as opposed to formal querying language, e.g., "show me product details," "show me the supplier details," "Show IPSUM" (as displayed in FIG. 3B), etc. User 102 may enter non-language-based inputs, i.e., symbolic inputs, as well, for example, user 102 may write a checkbox, draw an "X", circle a piece of data, draw an arrow between data entities or natural language inputs, enter other swipe, draw a line, draw a picture, etc. User experience 120 may employ an input area 302 to allow user 102 to enter natural language and other navigational commands in familiar fashion, i.e., as a person would write on a piece of paper.

In 504, user experience 120 may classify the input received in 502. User experience 120 may employ classifier 238 to use optical recognition software in order to classify the input as text, symbolic, or navigational constructs. Received inputs may be classified according to a set of mapped user actions. In an embodiment, these mapped user actions may be organized according to the nature of the user intent. For example, an input may be classified as "create query," "redo query," "refine query," etc. In another embodiment, received inputs may be classified into navigational constructs, e.g., "scroll," "switch to landscape mode," "save page," "generate table," etc. Classifier 238 may use content relator 222 and content interpreter 224 may examine the content in order to determine an appropriate classification. Context persistency module 210 may analyze relevant user context in order to further assist in the determination of the classification.

In 506, method 500 may determine if the input received in 502 and classified in 502 was ambiguous. If the input is ambiguous, then method 500 proceeds to 508. If there is no ambiguity in the input, then method 500 proceeds to 514. In an embodiment, an ambiguous input is one for which more than one classification is identified in 504. Thus, in this embodiment, an unambiguous input is an input for which only one classification is identified in 504.

In 508, user experience 120 may resolve any ambiguity in the input. In an embodiment, discovery component 231 may use clarification enactor 232 and/or hierarchy model 233 to determine the identified classification/system assets 158 that are more likely than others to result in providing user 102 the appropriate result in user experience 120. In an embodiment, user experience 120 may resolve ambiguity based on information contained in service discovery module 230 and/or context persistency module 210. These ambiguity resolution techniques and processes are described in further detail below with reference to FIGS. 7-9.

In 510, user experience 120 may determine if the ambiguity was resolved. If the ambiguity was resolved, then method 500 proceeds to 514. If the ambiguity was not resolved, then method 500 proceeds to 512.

In 512, user experience 120 may prompt user 102 for additional information in order to resolve the ambiguity. In an embodiment, user experience 120 may resolve ambiguity with direct feedback from user 102 via clarification enactor 232. Such prompts may be received in the form of additional natural language, selections among options, navigation controls, etc. In an embodiment, user 102 may select to refine the original natural language query or select from among classifications and/or system assets 158.

In 514, user experience 120 may determine if the input is a query, i.e., a request for data from backend system 150. If the input is a query, then method 500 proceeds to 516. If the input is not a query, then method 500 proceeds to 524.

In 516, query processor 200 may identify an appropriate service (e.g., API 154), asset (e.g., system assets 158), database resource (e.g., database 152), and/or other system asset in backend system 150 to interact with in order to respond to the natural language query. Service and resource discovery services provided by service discovery module 230 in query processor 200 may map this model of the query to database 152, API 154, and/or system assets 158 to process the query and retrieve appropriate results. The determination of an appropriate system asset by query processor 200 may have three different outcomes:

(1) No matching system asset is discovered;
(2) Exactly one system asset is discovered (i.e., an exact match); or
(3) More than one system assets are discovered matching the query.

In an embodiment, query processor 200 may allow user 102 to reject a discovered asset as being an incorrect match to the query. In such an embodiment, query processor 200 may proceed to other-identified system assets in order to return follow-up matches to user 102. In an embodiment, query processor 200 may allow user 102 to choose a particular discovered asset that user 102 considers to be a correct match. In the case that no system assets are discovered, query processor 200 may provide a list of available system assets to user 102 so that user 102 a system asset that user 102 considers to be a correct match. After identifying an appropriate system asset and linking it to the natural language, service discovery module 230 may update historical user flows 235 and neural network 236 based on the interaction. Context persistency module 210 may update information in context repository 214 and context sources 270.

In 518, query processor 200 may create, retrieve, or otherwise invoke a formal language query based on the natural language entered by user 102. In one embodiment, query processor 200 may receive from metadata 160 appropriate formal language for execution following the identification of an appropriate system asset based on the received informal natural language. In other words, system assets 158 may have formal querying language associated with them as stored in metadata 160, and query processor 200 may retrieve the formal query language from identified metadata 160. For example, metadata parser 237 may receive a formal SQL query after query processor 200 determines the appropriate system assets related to the natural language query. In one embodiment, metadata parser 237 may retrieve such a formal query by parsing an XML file or through JSON or other data-interchange format.

In 520, query processor 200 may run the query against backend system 150, database 152, or other identified system asset in order to retrieve results related to the user input. Query processor 200 may harness OData services 250 to query data in the identified system resources. In some embodiments, OData services 250 may also perform data updates and inserts. In other embodiments, query processor 200 may harness standardized technologies such as HTTP, Atom/XML, and JSON and/or leverage ODBC, JDBC, .NET, or other suitable access methodology in order to retrieve the data, perform updates to existing data, insert records, and perform other data-based operations.

In 522, query processor 200 may receive results from backend system 150 via OData services 250. In an embodiment, query processor 200 may receive results from processing the formal language query using a pipe or other suitable information flow construct. After 522, method 500 proceeds to 526.

In 524, entered from 514 when the user input is not a natural language query, user experience 120 may determine an appropriate action to take based on the navigational and non-querying input. For example, user 102 may input a symbol in navigation control 312, for example a checkbox, an "x," an arrow, etc. In one example, user 102 may enter a checkbox in navigation control 312 to be interpreted by user experience 120 as a request to process any natural language entered in input area 302. User 102, may also formulate navigational requests as natural language for interpretation by query processor 200. In another example, user 102 may write "go to reports page," and user experience may interpret this as a request to save the report and navigate to the reports or home page (e.g., a page akin to the page displayed in FIG. 3C.)

In 526, user experience 120 may render, re-render, or otherwise depict the changes in input area 302, result 308, and other elements of user experience 120 based on the navigation action determined in 516 or the updated formal language query and/or data set received in 522. The original result 308 may be updated to display an updated table, chart, or graph. Or result 308 may be updated to include additional tables, charts, graphs, or other system assets. User 102 may subsequently interact with the tables, charts, graphs, or raw data by writing additional natural language, drawing on or around the data elements, or otherwise providing decipherable, pen-stroke inputs. Thus, one skilled in the arts will appreciate user experience 120 may continue to operate in iterative fashion at this point, i.e., user 102 may enter additional natural language commands and or navigation controls in order to continue to explore and interact with data contained in backend system 150 or other systems related to applications 130.

Machine Learning in Digital Paper Based Interaction

By harnessing artificial intelligence, a user experience, such as user experience 120, may better interpret users' intentions over time as interactions occur between users and the user experience. Using machine learning and modeling techniques, user experience 120 may deliver to users a more streamlined, anticipative, and ultimately useful user experience by suggesting or assuming user actions, workflows, and data paths based on previous interactions with users. User experience 120 may enhance the interpretation of natural language with conclusions about these workflows and data paths. User experience 120 may store its findings in a knowledge base, lookup index, or other suitable repository. These enhancements may also be made available to and used by ancillary applications once the knowledge base is assembled.

As described above, optical recognition technologies, contextual analysis, and semantic analysis may be employed by user experience 120 to derive meaning from a user's written natural language and other drawn or inputted symbols and navigational constructs. User experience 120 may identify system assets, such as system assets 158, and link these assets with the written language entered by users, retrieve data from system assets 158, and display graphs, charts, tables, etc. for view from display 118.

Moreover, user experience 120 may learn from the derived intents and apply these to future user interactions. In a simple, merely exemplary embodiment, user 102 may draw an "X" when confronted with a particular system asset, data set, condition, or other stimulus within user experience 120. User experience 120, over time, may learn to assume that a different (or the same) user confronted with an identical condition may be more likely to enter an "X." User experience 120 may suggest this course of action to the user or assume that the user's intent will be directed towards this action. User experience 120 may become so certain of this, based on the frequency of the occurrence, that user experience 120 may eliminate the need for user 102 to even enter the "X." Instead, user experience 120 may just automatically engage in an appropriate action to accomplish "X," display "X," retrieve "X," etc.

In another example, user 102 may view a chart or graph of sales for a particular customer, e.g., "Company A." User 102 may write "add sales data for Company B." User experience 120 may optically interpret the actual writing, contextually interpret the user's intention(s), interact with applications 130 and/or backend system 150 that houses the chart's data, retrieve additional data for customer "Company B", and re-render the chart to include the sales data for both customer "Company A" and "Company B." Moreover, user experience 120 may log this event and apply it to future interactions. If user 102 frequently requests data for "Company B" after viewing data for "Company A," user experience 120 may learn that this particular user may always want to view data for "Company B" immediately after viewing data for "Company A." User experience 120 may make a suggestion or provide a shortcut to view data for "Company B" whenever the user views information related to "Company A." Or user experience 120 may automatically retrieve the data for "Company B" in addition to "Company A" when interpreting inputs from user 102.

Both of the foregoing examples are merely illustrative. One skilled in the arts will appreciate that these examples are in no way exhaustive. Many other types of interactions and conclusions may be used by user experience 120 in order to apply machine learning in order to make the user experience more robust and streamlined.

In situations where user 102 is satisfied with an intent determined by user experience 120, the system assets displayed by user experience 120, and/or the actions undertaken by user experience 120 using those system assets, user experience 120 may log or record the interaction in historical user flows 235. Such a satisfaction indicator may be expressly entered by user 102 and received by user experience 120 or such a satisfaction indicator may be implicitly derived based on subsequent user actions or other user behaviors. For example, if user 102 asks a follow-up question in the form of a natural language query, user experience 120 may assume that the retrieved system asset was satisfactory.

In other scenarios, user experience 120 may determine an intent, select a system asset, or perform an action that is not desired by user 102. In other words, user experience 120 may occasionally make mistakes in interpreting a user's intention regarding the natural language or other symbols entered. In an embodiment, user 102 may expressly indicate that the returned result was not appropriate. In another embodiment, user experience 120 may assume dissatisfaction based on subsequent user actions, e.g., if the user immediately exits the report or creates a new report. In either embodiment, user experience 120 may log or record these interactions in historical user flows 235. In one embodiment, user 102 may be able to clarify intentions and rollback mistakes resulting from misinterpretations through interactions with clarification enactor 232. As user 102 rolls back mistakes, clarifies misinterpreted actions, and performs subsequent actions over time, user experience 120 may learn from the mistake and apply these learnings to fixture user interactions.

In this fashion, user experience 120 may build a knowledge base of user habits and user responses when faced with particular data or system assets. The knowledge base may be broken down into cases or flows, i.e., a series of interactions with user experience 120 and/or system assets 158. The knowledge base may further include positive and negative satisfaction indicators based on retrieved data and performed actions. For instance, if a user responded in a certain way when faced with a particular system asset, e.g., a table, graph, or raw data or a particular quality contained in the displayed system asset, user experience 120 may assume that future users may react similarly. User experience 120 may build a knowledge base of user actions and interactions in order to better anticipate future user decisions.

User experience 120 may then harness the knowledge base to recommend appropriate courses of action or paths of executions to users and further improve the user experience. User experience 120 may apply these knowledge bases to future interactions with users. In some embodiments, user experience 120 may build a knowledge base that is specific to each user. In this fashion, a user may tailor the system to the users' own unique, desired way of working. Thus, in this embodiment, the artificial intelligence employed by user experience 120 may improve over time to match that particular user's habits. In some embodiments, organizational or other subject-matter experts may be leveraged by user experience 120 to further train artificial intelligence models when the machine intelligence is unable to provide or retrieve requested details or information.

Moreover, the knowledge base may be used by applications 130 to improve customer experiences across a range of applications distinct from user experience 120. In other words, the knowledge base, once assembled, has a utility in contexts outside of the pen-and-paper user experience and may be used to improve a wide-array of use cases across various applications that use the relevant system assets.

Figure 6:
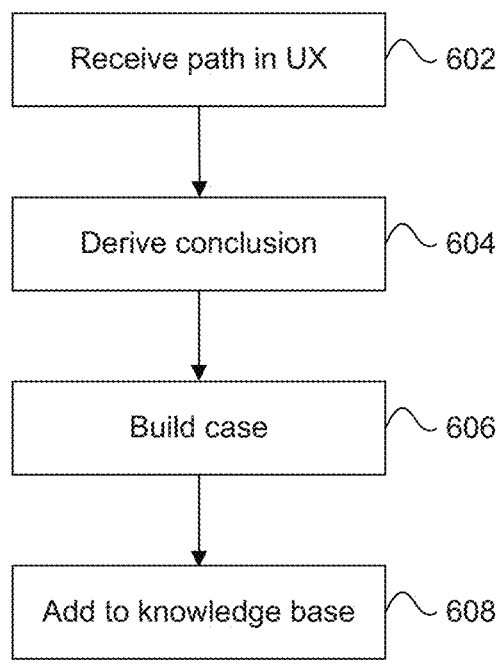
FIG. 6 is a flowchart illustrating a process for applying machine learning techniques to improve a pen-and-paper user experience, according to some embodiments.

FIG. 6 is a flowchart illustrating a method 600 for applying machine learning techniques to improve a pen-and-paper user experience, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art(s).

In 602, user experience 120 may receive a path from user 102 in the form of various received natural language queries and other navigational inputs, as described above with reference to FIG. 3. This process may be iterative, and user 102 may request various system assets 158 in succession, perform a series of actions against a retrieved system asset, engage in other actions in success, or perform some combination thereof. Thus, a path may be thought of as a series of actions performed to retrieve a set of data and respond to or interact with the data upon retrieval. User experience 120 may record these inputs in historical user flows 235. User experience 120 may store in knowledge base 170 or historical user flows 235 various information associated with the received inputs in the flow, e.g., parent/children actions and/or requests, time of day, desired system asset, context information, semantic information, information derived or used by context persistency module 210, content management module 220, service discovery module 230, and/or query transformation module 240, and any other suitable information. User experience 120 may associate the received flow with a particular user, or user experience 120 may store the received flow without an association to a particular user. In an embodiment, user experience may build an appropriately formatted neural network, for instance in neural network 236, to store characteristics of the flow and employ supervised learning, unsupervised learning, or other learning algorithm to derive additional conclusions based on future flows.

In 604, user experience 120 may derive a conclusion based on the path received in 604. User experience 120 may employ a suitable classifier, such as classifier 238, to assign a label to the received flow and to categorize the flow. For example, user experience 120 may employ a Naïve Bayes Classifier Algorithm, K-Clustering analyses, vector machine learning algorithm, linear regression model, or any other suitable learning algorithm to derive a conclusion based on data received in 602. In some situations, a suitable conclusion may be drawn by user experience 120 based on one received path. In other situations, suitable conclusions may be drawn only when a met threshold of data is received by user experience 120.

In 606, user experience 120 may build a case and store the case in knowledge base 170 and/or historical user flows 235. A case may be stored in a variety of suitable forms, for example, in database tables, XML files, text files, or other suitable appropriate. A case may include natural language, identified system assets, actions undertaken, and other applicable information. A case may be hierarchical, i.e., describe sequences of actions and/or undertaken steps or a case may example only one step or action. A case may include links to sources in backend system 150 and/or other external documentation. For example, in the above-mentioned situation where user 102 always draws an "X" in response to a particular data condition, the case may include the parent condition (the data condition), the action (the drawing of the "X"), relevant documentation (stored about conducting an action "X"), information about user 102, contextual and semantic analyses, and other case-based data. The knowledge base may be stored using any appropriate information architecture.

In 608, user experience 120 may add the built case to knowledge base 170. In an embodiment, knowledge base 170 may be navigated or explored. Knowledge base 170 may provide or be accessed using an appropriate application programming interface. In this fashion, user experience 120 may use knowledge base 170 to recommend appropriate courses of action or paths of executions to users. Moreover, knowledge base 170 may be used by applications 130 to improve customer experiences across a range of other applications. For example, another application presenting the data condition mentioned above may look up the case in knowledge base 170 based upon that data condition, determine that "X" is a customary response, and suggest a response of "X" to the user of that application.

Ambiguity Resolution in Digital Paper Based Interaction

A pen-and-paper-based user experience may be extended and enhanced to allow a user to interact with a suite of applications, a launchpad, a digital boardroom, a key performance indicator tool, or other application using the same pen-and-paper-based design paradigm. The user experience may perform additional ambiguity resolution techniques based on user context garnered from these ancillary applications.

A suite of software applications may include a launchpad via which the applications in the suite of software applications may be initiated or invoked. The applications in the suite of software applications may be a wide-array of software programs spanning multitudinous services and industries. For example, and without limitation, applications may include customer relationship management tools, enterprise resource planning tools, word processing applications, communication applications, product lifecycle management tools, supply chain management software, general business solutions, and many other types of applications. The applications may not be limited only to business needs and may be applications used by individuals for entertainment, personal, financial, or any other purposes. The applications may display, retrieve, and otherwise interact with various forms of data, such as those described above with reference to applications 130. The applications may retrieve the data from a database management system using queries, OData services or calls, or other retrieval and data-interaction techniques. The data may be arranged into tables, charts, graphs, etc. or displayed as raw data.

In one embodiment, the application may be a digital boardroom or other enterprise data exploration tool. In an embodiment, such a digital boardroom may equip business executives with real-time contextual information enabling the executives to perform ad-hoc analyses. The digital boardroom may include multiple screen displays for use in business meetings or other gatherings. Mobile devices in the room may further interact with the digital boardroom.

In another embodiment, the application may be a digital assistant. A digital assistant may analyze formal and unstructured speech to contextualize user commands and may leverage artificial intelligence, natural-language processing, machine learning, and ancillary knowledge bases to formulate and provide appropriate responses and actions to the user commands.

User experience 120 may employ machine learning techniques to refine and develop an approach to interpreting ambiguous input using context from these additional applications. In such an embodiment, a user, such as user 102 may indicate to user experience 120 or applications 130 that the interpretation determined by query processor 200 is erroneous or otherwise not desired. In this case, the false positive may be recorded in context persistency module 210 and/or service discovery module 230. User inputs may be used to formulate a model-based schema or other suitable artificial intelligence construct from which to guide future user input interpretations. The user input may be used to update links between natural language and discoverable system assets stored and used by service discovery module 230.

Ambiguity may also be present in what user 102 intends or wishes to do with identified system assets. In other words, the action that user 102 intends to conduct with the data retrieved from system assets 158. For example, user 102 may intend or wish to see information arranged graphically (i.e., via a chart), or user 102 may want to see the same identified data arranged in a table. These intentions or wishes may be determined by the types of services attached to the identified system assets (i.e., API 154 associated with system assets 158 via metadata 160). If an analytical view and service are available, user experience 120 may, for example, show a chart-based visualization of the data to user 102.

Query processor 200 may build core descriptions of services and resources and then model and evaluate the descriptions against the incoming natural language query, for example, via a naïve Bayes method or other text classification approach. In an example implementation, these models may be built on outside sources or documentation.

Query processor 200 may be configured to perform contextual analysis of an incoming natural language query to identify the intent of the literal text in the natural language query based on the context in which user 102 wrote the query. A natural language query may be enriched with contextual information based on an understanding of the user intention when inputting the natural language query. Such enrichment of the natural language query may improve analysis and mapping of the query to relevant business assets. In one embodiment, the context pertains to previous interactions within user experience 120. In an alternate embodiment, the context reflects interactions within an associated suite of applications, a launchpad, a key performance indicator tool, a digital boardroom, or other application that receives the input.

In a first case, user experience 120 may find no appropriate match among system assets 158 with which to perform the identified intention or wish. In this case, user experience 120 may prompt user 102 to select from a list of available system assets or request further input from user 102. In a second case, user experience 120 may locate exactly one service available to perform the intention or wish of user 102 or receive confirmation from user 102. User experience may accordingly call the one service to retrieve data according to the intention or wish of user 102. In a third case, user experience 120 may identify multiple services available to perform user 102's intention or wish. In this third case, user experience 120 may prompt user 102 to select from one of the multiple available services, and user experience 120 may then accordingly call the selected service to retrieve data. Service discovery module 230 may record or log these interactions with user 102 for recall when making similar decisions in the future. Once user experience 120 determines both the subject and intention of the query, database 152, API 154, and/or system assets 158 may be called, and the data displayed back to the user and any actions reflecting the intention of user 102 such as Save, Create, etc. may be performed.

In one embodiment, for context enrichment, query processor 200 may enhance or enrich the model of a natural language query as basic-entity tuples [Topic or Subject, Intent, Criteria] with both a unique ID for each query and a context object which may be referred to and used to resolve associations between queries:

[QueryID, subject, intent, criteria].

Query processor 200 may provide a context object storage for each QueryID, which may be accessible via context [QueryID].property. In this manner expressions such as "show me that supplier" and "OK. Show me its address" may be modeled by query processor 200 as:

[supplier, read, where supplierID=context[1].contract.supplierID];

[supplier.address, read, where supplierID=context[1].contract.supplierID].

Moreover, the context object may reflect states or statuses within the suite of applications, a launchpad, a key performance indicator tool, a digital boardroom, or other application.

Query processor 200 may consider sessions in user experience 120 and applications 130 as being defined or formed over a time period or ongoing use of an application (such as typical in classic web-based session management) and also as being defined or formed by context. Multiple queries may form a session where the session has the same subjects or refer to the same query. For example, consider the following example set of three queries: (1) "Show me suppliers for this contract"; (2) "What is the weather in Berlin like this week?"; and (3) "Show me alternative suppliers in that city?" This example set of queries may be answered by two or more independent objects, for example, a weather service for weather information and a sales service for the sales (contracts) objects. However, the three queries in the set are related as they may provide contextual information for each other (e.g., by the criteria of the queries, "this week", "Berlin"). Additional, query processor 200 may retrieve information from the suite of applications, a launchpad, key performance indicator tool, a digital boardroom, etc. for use by context persistency module 210. For example, the meaning of "this contract" may be enhanced by analyzing a contract being viewed in a digital boardroom during a business meeting.

Modeling the example set of queries as a flat set of queries may increase the difficulty in tracking which contextual information relates to which query. Thus, query processor 200 may differentiate between sessions based on a subject type in order to develop a richer (i.e., more descriptive) model to determine the user intent behind a given query. Query processor 200 may use such a richer model to track multiple queries that may be submitted by user 102 in a single session, either within user experience 120 or a suite of applications, a launchpad, a digital boardroom, or other application using the same pen-and-paper-based design paradigm. In an embodiment, a session that commences within user experience 120 may auto-authenticate and continue within, for instance, a digital boardroom. Similarly, a session within a digital boardroom may result in commencing an interaction or session within user experience 120.

Across such applications (including user experience 120), user 102 may enter queries in an activity context or a work context (e.g., in response to viewing a certain web site, a work site, a business object, or in response to an event that occurred). To aid in contextual discovery of a query and to increase accuracy of processing the query, sources of context information may be accessed for a contextual analysis. The context information may help identify the assets being referred to in the query by user 102 or system assets 158 that may be needed to answer the query.

Consider for example, the previously described example scenario in which user 102 receives information that a supplier contract for a product is up for renewal. When user 102 responds, for example, with the query "show me the supplier", discovery component 231 may assume that user 102 refers to the supplier of the contract in the given situation. Therefore, the context object of a particular user may be built from existing data of interactions engaged in by user 102 (i.e., data that a supplier contract for a product is up for renewal). In general, context, subjects and previous query tuples may be derived from previous actions made by the user and used to enrich or enhance the contextual model of the user. The situation in the previously described example scenario in which user 102 receives information that a supplier contract for a product is up for renewal, the context may be modeled, for example, in the same form as if user 102 queried for that contract. A modeled context object may, for example, be:

[0, 1000, contract, read, where contractID=100021].

Then, when the user submits a query for the supplier (e.g., Show me suppliers for this contract), this foregoing modeled context object is now available to relate to the statement:

[1, 1000, supplier, read, where supplierID=context[0].contract.supplier].

In example embodiments of query processor 200, multiple queries may form or define a session where each session has the same subjects or referrals to the same query. Query processor 200 may extend or enrich the model of the natural language query to be tuples (e.g., [QueryID, SessionID, subject, intent, criteria]), where sessionID may be formed or defined based on a likelihood of matching subjects. Queries in the foregoing example set of three queries may be modeled, respectively as:

[1, 1000, supplier, read, where supplierID=context[1].contract.supplierID];

[2, 1001, weather, read, where city=Berlin];

[3, 1000, supplier, read, where supplierID != context[1].supplierID AND supplier.address.city !=context[2].city].

Figure 7A:
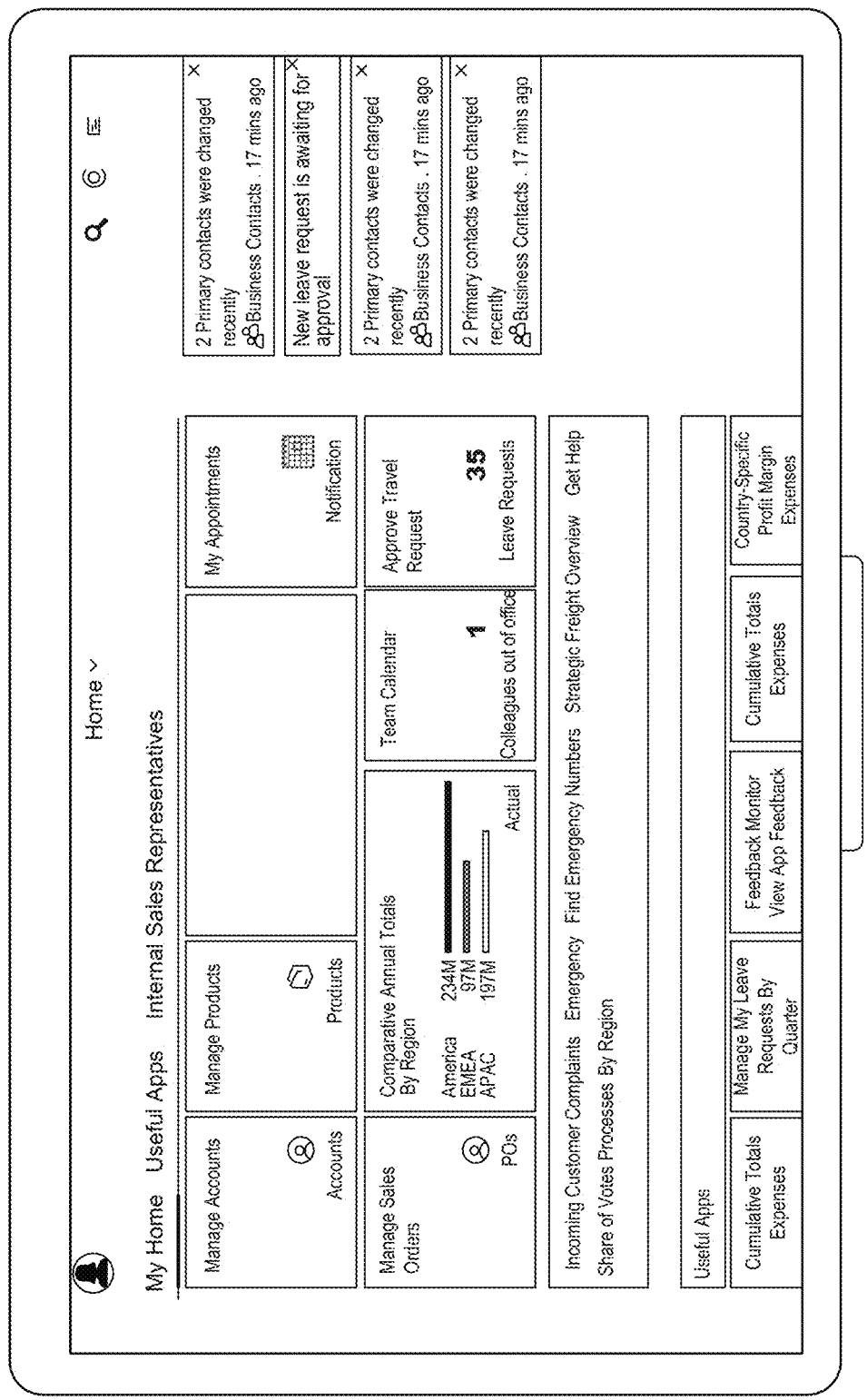
FIGS. 7A-7C are example screen displays of an exemplary launchpad for a suite of client applications, according to some embodiments.
Figure 7C:
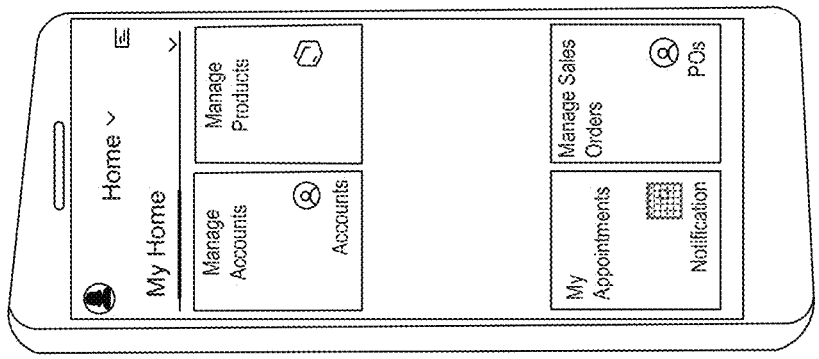
Figure 7B:
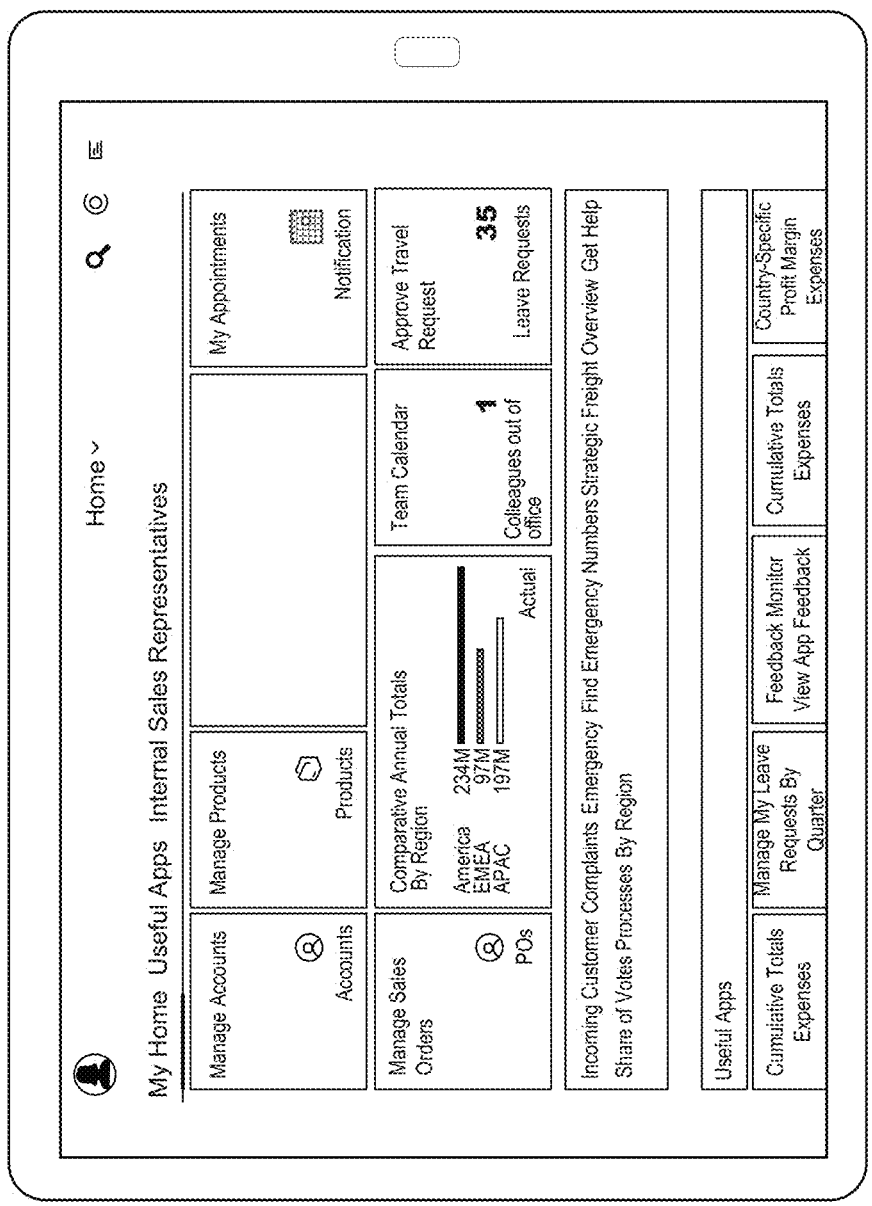

FIGS. 7A-7C are examples of screen display 700 of an exemplary launchpad for a suite of client applications, according to some embodiments. FIGS. 7A-7C reflect various example versions of the launchpad as viewed by disparate devices, such as computing device 110. The screen displays provided in FIGS. 7A-7C are merely exemplary, and one skilled in the relevant art(s) will appreciate that many approaches may be taken to provide a suitable screen display 700 in accordance with this disclosure.

FIG. 7A reflects an exemplary version of a launchpad for viewing by user 102 from a desktop computer. FIG. 7B reflects an exemplary version of a launchpad for viewing by user 102 from a tablet device. FIG. 7C reflects an exemplary version of a launchpad for viewing from by user 102 a mobile phone device. One skilled in the art(s) will appreciate that the different screen sizes and available capabilities across these devices may present difficulties in rendering an appropriate launchpad. Moreover, certain client applications, such as applications 130 may not function on a particular device type.

In an embodiment, the launchpad displayed in FIGS. 7A-7C may be configured to receive pen-and-paper style input directly in, on, and/or among the various applications included therein. In an alternate embodiment, such a launchpad may be configured to invoke a pen-and-paper based user experience, such as user experience 120 described above, by clicking an appropriate icon/tile/etc. Content management module 220 may consider the circumstances surrounding the launching of user experience 120, for example the application being viewed at the moment of launching.

Figure 8:
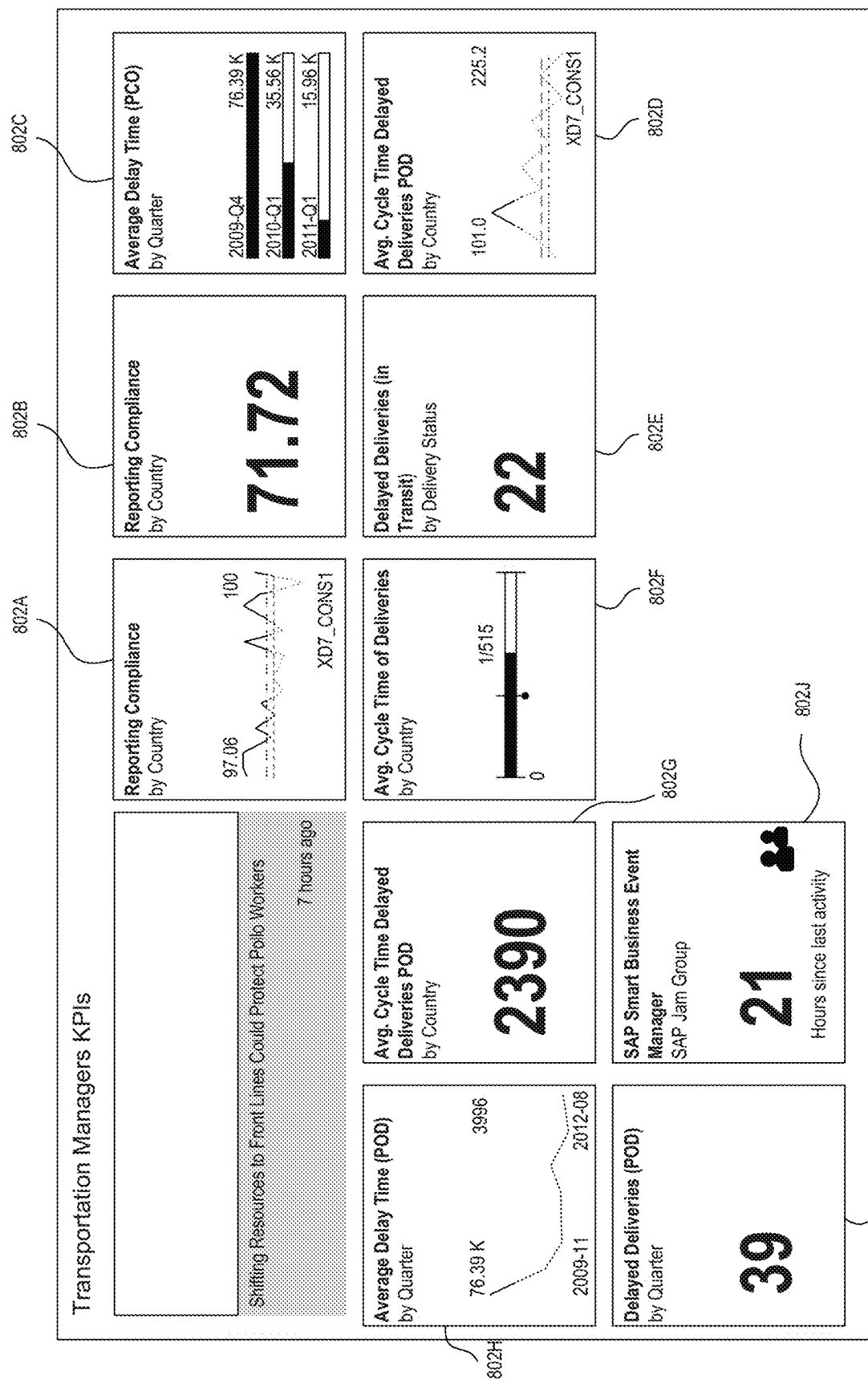
FIG. 8 is an example screen display of exemplary key performance indicator (KPI) tool, according to some embodiments.

FIG. 8 is an example screen display of exemplary key performance indicator tool, according to some embodiments. The screen display provided in FIG. 8 is merely exemplary, and one skilled in the relevant art(s) will appreciate that many approaches may be taken to provide a suitable screen display 800 of a key performance indicator tool in accordance with this disclosure.

KPI 802 may be data driven indicators drawn from data across a wide-array of data-driven applications. KPI 802 may include a title, a formula describing a calculation, and various other metadata associated with KPI 802. KPI 802 may display an integer, decimal, floating point number, string, or other text. KPI 802 may also display a line graph, bar graph, chart, or other visualization of the tool. Metadata associated with KPI 802 may include contextual information and a formal language query (or queries) used to generate KPI 802. FIG. 8 exhibits several merely exemplary illustrations of KPI 802.

Figure 9:
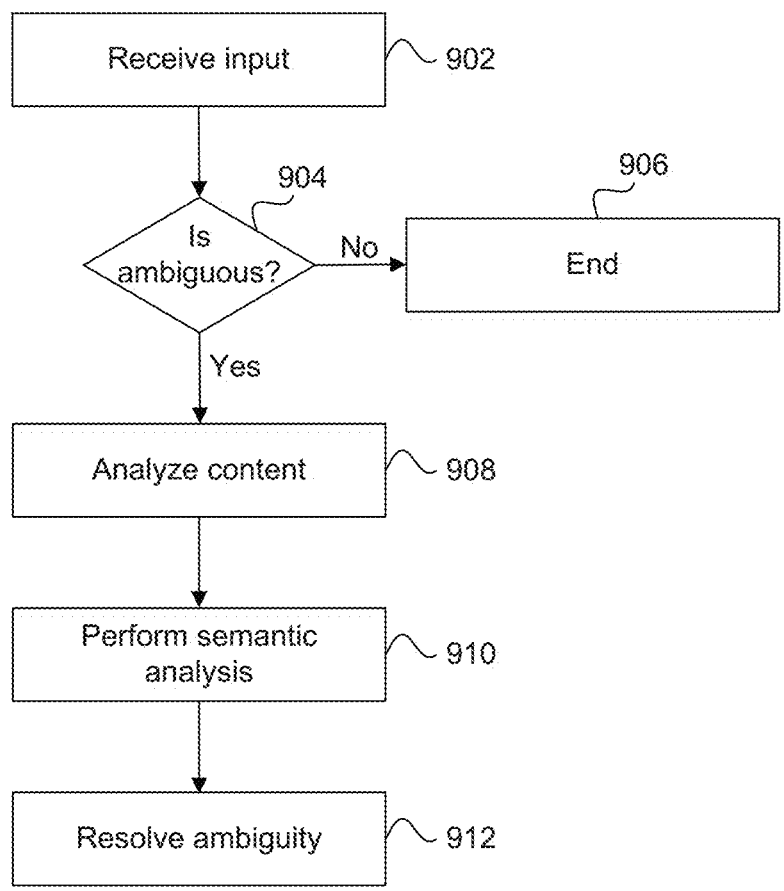
FIG. 9 is a flowchart illustrating a process for resolving ambiguity in inputs to a pen-and-paper-based user experience, according to some embodiments.

FIG. 9 illustrates a method 900 for resolving ambiguity in an input to a pen-and-paper user experience, according to some embodiments. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art(s).

In 902, user experience 120 may receive input from user 102 via computing device 110. In an alternate embodiment, applications 130 (suite of applications, a launchpad, a key performance indicator tool, a digital boardroom, etc.) may receive the input from user 102 via computing device 110. In an embodiment, the input may be a character, word, phrase, sentence fragment, sentence, symbol, gesture, or other suitable entry created using a pen-like input. The pen input may be entered by user 102 using a pen, stylus, input gesture, or other suitable mechanism for writing. User 102 may write natural language indicating a request for data or information. User 102 may enter non-language-based inputs, i.e., symbolic inputs, as well, for example, user 102 may write a checkbox, draw an "X", circle a piece of data, draw an arrow between data entities or natural language inputs, enter other swipe, draw a line, draw a picture, etc. This step is described in further detail above with reference to FIG. 5.

In 904, user experience 120 may determine if the input received in 902 is ambiguous. If the input is ambiguous, then method 900 proceeds to 908. If there is no ambiguity in the input, then method 900 proceeds to 906. In an embodiment, an ambiguous input is one for which more than one user intent, system asset, and/or action may be determined by service discovery module 230.

In 906, method 900 ends because no ambiguity exists in the user input. Accordingly, no ambiguity resolution is needed.

In 908, query processor 200 may analyze the context in which the natural language query or symbolic input was received. The context may include information in context repository 214 as well as information received from a suite of applications, a launchpad, a key performance indicator tool, a digital boardroom, etc. To illustrate the concepts of context enrichment by query processor 200, consider a scenario similar to the previously described example procurement scenario in which an enterprise or organization has a contract in place with a supplier to provide a certain number of units of a product. In this scenario, user 102 in a new session (either in user experience 120 or applications 130) related to the contract may be faced with a situation that a contract having unique identifier "C0001" is almost complete and requires a decision on renewal. User 102 may then submit one of two natural language queries: Q1: "product details?" and Q2: "supplier details?" via user experience 120 to query receiver 226. In response, query receiver 226 may try to retrieve a current context object for the session. As this is a new session for user 102, content interpreter 224 may create a new context object and analyze the different interactions that user 102 may have had with the system in the current session. In the present scenario, content interpreter 224 may model the situation to provide a relation to a contract object (for the situation). Reference to the contract object may be then stored in the context object to persist by context data services 212.

In 910, query processor 200 may perform semantic analysis of the natural language fragment. Query processor 200 may deconstruct the ambiguous user input into composite parts. For example, entity mapper 242, may model a natural language query based on grammar, i.e., a construct having a subject, an optional auxiliary verb, a main verb, and qualifiers. The verb usage in the natural language query may indicate intents behind the natural language query. Query processor 200 may leverage or employ elements of natural language processing to determine the semantic meaning of the text. Query processor 200 may analyze the natural language to determine a semantic meaning using semantic parsing, latent semantic indexing/analysis, command and control approaches, semantic tagging, word distance functions, vector space models, or other natural language processing toolkits/methodologies. Context sources 270 may provide a dictionary associated with the model to derive further meaning from scanned natural language. In an embodiment, query processor 200 may invoke formal rule definitions, statistical language modeling, connectionist language modeling, vector space modeling, neural language modeling, or other manners of analyzing human language. In an embodiment, query processor 200 may employ language- or culture-structures to analyze natural language among and across different populations.

To continue the above example, in 910, the two natural language queries Q1: "product details" and Q2: "supplier details" may be sent to semantic components 260 to be semantically analyzed into token model entities: subjects, intention, and criteria, as follows:

Q1: product—subject, details—intention, criteria—empty;

Q2: supplier—subject, details—intention, criteria—empty.

Content relator 222 may receive and associate the token model entities with the current context of the user to determine which product or which supplier the end-user may be referring to in the queries Q1: "product details" and Q2: "supplier details". The current context object for the session may include the situation and its associated object (i.e., contract number C0001). Content interpreter 224 may analyze the object model of contract number C0001 to ascertain whether it has any associated product or supplier objects. If matches are found for any associated product and supplier objects, content interpreter 224 may update the query model as follows:

Q1: product—subject, show—intention, criteria—productID=context.contract[C1001].productID;

Q2: product—supplier, show—intention, criteria—supplierID=context.contract[C1001].supplierID.

It will be noted that that a service may not yet have been discovered at this stage by query processor 200. The query model updated by content interpreter 224 is a model of the query in terms of a context and a set of query tuples representing a subject—intention—criteria relationship: {Context, [Subject, Intention, Criteria]}. Content relator 222 may forward the foregoing contextually updated query model to service discovery module 230 for discovery of services and resources to further semantically enrich the incoming queries. Service and resource discovery services may be used to map this model to concrete business assets (i.e. services) that may respond appropriately to the query.

In 912, query processor 200 may resolve any ambiguity in the input based on the contextual and semantic analyses performed above. In an embodiment, discovery component 231 may use clarification enactor 232 and/or hierarchy model 233 to determine the identified classification/system assets 158 that are more likely than others to result in providing user 102 the appropriate result in user experience 120. In an embodiment, user experience 120 may resolve ambiguity based on information contained in service discovery module 230 and/or context persistency module 210.

Example Computer System

Figure 10:
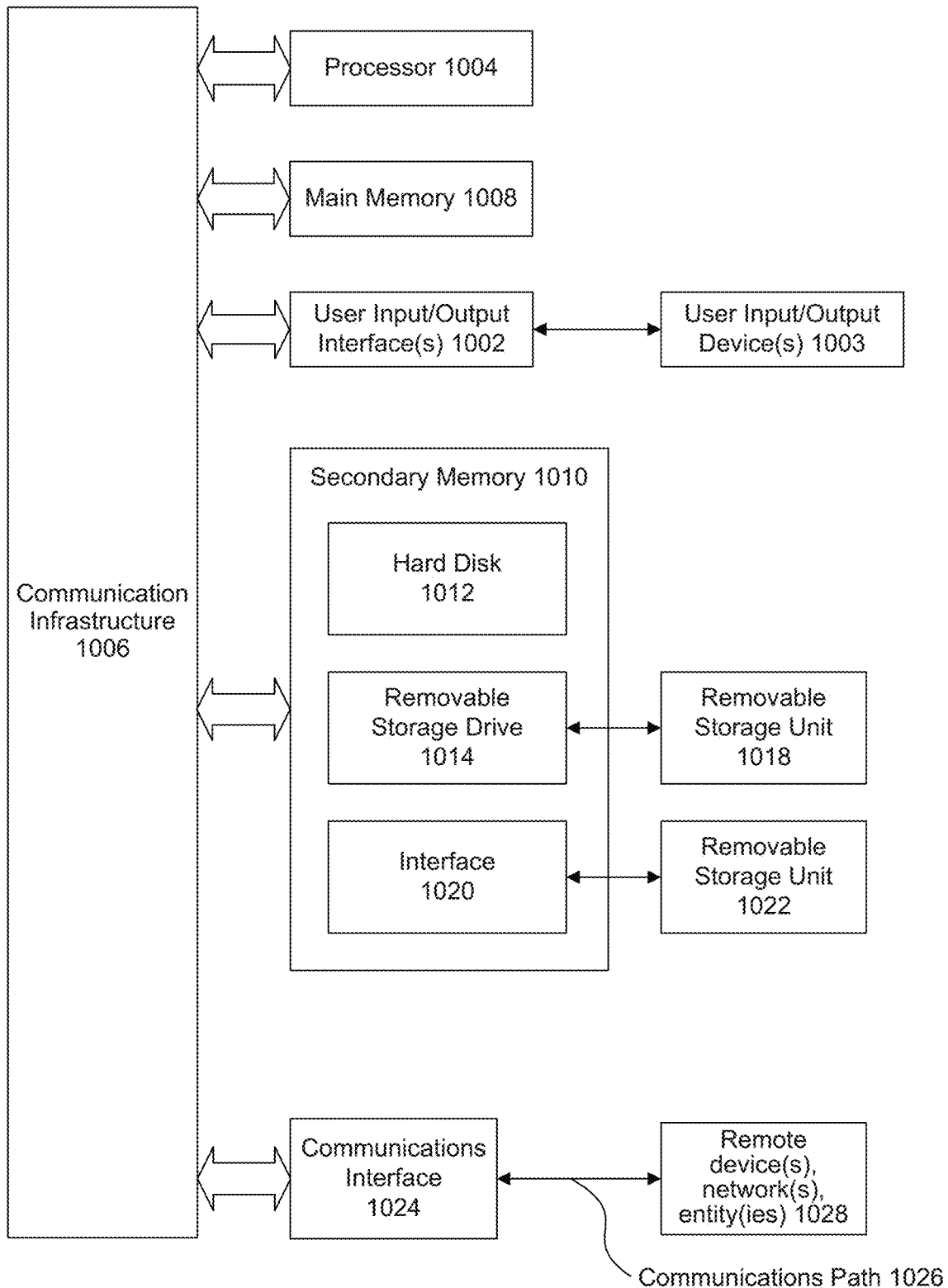
FIG. 10 illustrates a block diagram of a general purpose computer that may be used to perform various aspects of the present disclosure.

FIG. 10 is an example computer system useful for implementing various embodiments. Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1002, such as monitors, keyboards, pointing devices, etc., which may communicate with communication infrastructure or bus 1006 through user input/output device(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1100 may be derived from standards including but not limited to JavaScript Object Notation (JSON), Extensible Markup Language (XML). Yet Another Markup Language (YAML), Extensible Hypertext Markup Language (XHTML), Wireless Markup Language (WML), MessagePack, XML User interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by a user experience, a written instruction from a user, wherein the user experience comprises an interactive frontend configured to accept the written instruction;
   analyzing the written instruction to determine a user intent and one or more parameters;
   calculating a context object using data retrieved from a plurality of content data sources, and using the context object to determine criteria associated with the written instruction based on criteria determined for another written instruction;
   creating a query tuple of objects comprising at least a subject, the user intent, and the criteria associated with the written instruction by the context object;
   mapping the query tuple to a system asset pertinent to the user intent;
   receiving a symbolic instruction from the user, wherein the symbolic instruction comprises non-natural language inputs from the user;
   interpreting the symbolic instruction, wherein the symbolic instruction facilitates the user intent;
   accessing metadata associated with the system asset, wherein the metadata comprises formal language;
   parsing the metadata to determine a formal language query based on the formal language and a display method related to the system asset and based on the interpreted symbolic instruction;
   retrieving a set of data from a data application using the formal language query and the one or more parameters; and
   rendering a representation of the set of data based on the display method,
   wherein at least one of the receiving, analyzing, determining, accessing, parsing, retrieving, and rendering, are performed by one or more computers.

2. The method of claim 1, further comprising:
   determining, by the user experience, whether the written instruction includes natural language; and
   when the written instruction includes natural language, performing a semantic analysis of the natural language to determine the user intent, the system asset, and the one or more parameters.

3. The method of claim 1, further comprising:
   determining, by the user experience, whether the written instruction includes natural language;
   when the written instruction does not include natural language, determining a navigational action to perform in the user experience based on the written instruction; and
   performing the navigational action in the user experience.

4. The method of claim 1, further comprising:
   receiving, by the user experience, a second written instruction from the user, wherein the second written instruction is entered on the rendered set of data;
   determining a second set of parameters based on the second written instruction;
   retrieving a second set of data from the data application using the formal language query and the second set of parameters; and
   rendering a representation of the second set of data based on the display method.

5. The method of claim 1, further comprising:
receiving, by the user experience, a second written instruction from the user, wherein the second written instruction compares the rendered set of data to a second rendered set of data;
determining a second set of parameters based on the second written instruction;
retrieving a second set of data from the data application using the formal language query and the second set of parameters; and
rendering a representation of the second set of data based on the display method.

6. The method of claim 1, further comprising:
determining, by the user experience, if the user has permission to access the system asset; and
rendering the representation of the set of data based on the display method only when the user has permission to access the system asset.

7. The method of claim 1, wherein the representation of the set of data is a chart, graph, or table.

8. A system, comprising:
a memory; and
at least one processor coupled to the memory, the at least one processor configured to:
receive a written instruction from a user of a user experience, wherein the user experience comprises an interactive frontend configured to accept the written instruction;
analyze the written instruction to determine a user intent and one or more parameters;
calculate a context object using data retrieved from a plurality of content data sources, and using the context object to determine criteria associated with the written instruction based on criteria determined for another written instruction;
create a query tuple of objects comprising at least a subject, the user intent, and the criteria associated with the written instruction by the context object;
map the query tuple to a system asset pertinent to the user intent;
receive a symbolic instruction from the user, wherein the symbolic instruction comprises non-natural language inputs from the user;
interpret the symbolic instruction, wherein the symbolic instruction facilitates the user intent;
access metadata associated with the system asset, wherein the metadata comprises formal language;
parse the metadata to determine a formal language query based on the formal language and a display method related to the system asset and based on the interpreted symbolic instruction;
retrieve a set of data from a data application using the formal language query and the one or more parameters; and
render the set of data based on the display method.

9. The system of claim 8, the at least one processor further configured to:
determine whether the written instruction includes natural language; and
when the written instruction includes natural language, perform a semantic analysis of the natural language to determine the user intent, the system asset, and the one or more parameters.

10. The system of claim 8, the at least one processor further configured to:
determine whether the written instruction includes natural language;

when the written instruction does not include natural language, determine a navigational action to perform in the user experience based on the written instruction; and
perform the navigational action in the user experience.

11. The system of claim 8, the at least one processor further configured to:
receive a second written instruction from the user, wherein the second written instruction is entered on the rendered set of data;
determine a second set of parameters based on the second written instruction;
retrieve a second set of data from the data application using the formal language query and the second set of parameters; and
render a representation of the second set of data based on the display method.

12. The system of claim 8, the at least one processor further configured to:
receive a second written instruction from the user, wherein the second written instruction compares the rendered set of data to a second rendered set of data;
determine a second set of parameters based on the second written instruction;
retrieve a second set of data from the data application using the formal language query and the second set of parameters; and
render a representation of the second set of data based on the display method.

13. The system of claim 8, the at least one processor further configured to:
determine if the user has permission to access the system asset; and
render the representation of the set of data based on the display method only when the user has permission to access the system asset.

14. The system of claim 8, wherein the representation of the set of data is a chart, graph, or table.

15. A non-transitory computer-readable device having instructions stored thereon that, when executed by at least one computing device, cause the at least one computing device to perform operations comprising:
receiving, by a user experience, a written instruction from a user, wherein the user experience comprises an interactive frontend configured to accept the written instruction;
analyzing the written instruction to determine a user intent and one or more parameters;
calculating a context object using data retrieved from a plurality of content data sources, and using the context object to determine criteria associated with the written instruction based on criteria determined for another written instruction;
creating a query tuple of objects comprising at least a subject, the user intent, and the criteria associated with the written instruction by the context object;
mapping the query tuple to a system asset pertinent to the user intent;
receiving a symbolic instruction from the user, wherein the symbolic instruction comprises non-natural language inputs from the user;
interpreting the symbolic instruction, wherein the symbolic instruction facilitates the user intent;
accessing metadata associated with the system asset, wherein the metadata comprises formal language;
parsing the metadata to determine a formal language query based on the formal language and a display method related to the system asset and based on the interpreted symbolic instruction;

retrieving a set of data from a data application using the formal language query and the one or more parameters; and rendering a representation of the set of data based on the display method.

16. The non-transitory computer-readable device of claim 15, the operations further comprising:

determining, by the user experience, whether the written instruction includes natural language; and when the written instruction includes natural language, performing a semantic analysis of the natural language to determine the user intent, the system asset, and the one or more parameters.

17. The non-transitory computer-readable device of claim 15, the operations further comprising:

determining, by the user experience, whether the written instruction includes natural language;

when the written instruction does not include natural language, determining a navigational action to perform in the user experience based on the written instruction; and performing the navigational action in the user experience.

18. The non-transitory computer-readable device of claim 15, the operations further comprising:

receiving, by the user experience, a second written instruction from the user, wherein the second written instruction is entered on the rendered set of data;

determining a second set of parameters based on the second written instruction;

retrieving a second set of data from the data application using the formal language query and the second set of parameters; and rendering a representation of the second set of data based on the display method.

19. The non-transitory computer-readable device of claim 15, the operations further comprising:

determining, by the user experience, if the user has permission to access the system asset; and rendering the representation of the set of data based on the display method only when the user has permission to access the system asset.

20. The non-transitory computer-readable device of claim 15, wherein the representation of the set of data is a chart, graph, or table.

* * * * *